US010789790B1

(12) United States Patent
Vandenbussche et al.

(10) Patent No.: US 10,789,790 B1
(45) Date of Patent: Sep. 29, 2020

(54) MICROMOBILITY ELECTRIC VEHICLE WITH ELECTRONIC DEVICE HOLDER AND INTEGRATED DISPLAY

(71) Applicant: Lyft, Inc., San Francisco, CA (US)

(72) Inventors: Gregoire Ludovic Vincent Vandenbussche, San Francisco, CA (US); Daniel Lami Goldstein, Berkeley, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/578,995

(22) Filed: Sep. 23, 2019

(51) Int. Cl.
| | | |
|---|---|---|
| *B60Q 1/00* | (2006.01) | |
| *G07C 5/08* | (2006.01) | |
| *G06K 7/10* | (2006.01) | |
| *H02J 7/02* | (2016.01) | |
| *B62J 11/00* | (2020.01) | |
| *G07C 5/00* | (2006.01) | |
| *H04W 4/44* | (2018.01) | |
| *B62J 99/00* | (2020.01) | |
| *G01C 21/36* | (2006.01) | |
| *B62J 45/00* | (2020.01) | |
| *B62J 45/40* | (2020.01) | |

(52) U.S. Cl.
CPC ............ *G07C 5/0825* (2013.01); *B62J 11/00* (2013.01); *B62J 99/00* (2013.01); *G06K 7/10297* (2013.01); *G07C 5/008* (2013.01); *H02J 7/025* (2013.01); *H04W 4/44* (2018.02); *B62J 45/00* (2020.02); *B62J 45/40* (2020.02); *G01C 21/36* (2013.01)

(58) Field of Classification Search
CPC ....... G07C 5/0825; G07C 5/008; H04W 4/44; B62J 11/00; B62J 99/00; B62J 2099/002; B62J 2099/004; H02J 7/025; G01C 21/36; G06K 7/10297
USPC ......................................................... 340/455
See application file for complete search history.

(56) References Cited

U.S. PATENT DOCUMENTS

| | | | |
|---|---|---|---|
| 6,204,752 B1 * | 3/2001 | Kishimoto | ............... B62J 99/00 340/432 |
| 6,584,872 B1 * | 7/2003 | Kojima | ................ B62K 21/125 74/551.8 |
| 7,898,439 B2 | 3/2011 | Bettez et al. | |

(Continued)

OTHER PUBLICATIONS

U.S. Appl. No. 16/391,294, filed Apr. 22, 2019, Bromwich et al.

(Continued)

*Primary Examiner* — Zhen Y Wu
(74) *Attorney, Agent, or Firm* — Haynes and Boone, LLP

(57) ABSTRACT

A micromobility electric vehicle comprising an electronic device holder and an integrated display to improve a user experience with the electric vehicle. The electric vehicle comprises handlebars coupled to an upper portion of a stem and configured to steer the vehicle, an electronic device holder having spring-loaded arms that retract at least partially into the handlebars, wherein the spring-loaded arms are configured to apply a force against edges of an electronic device when arranged between the spring-loaded arms, wherein the electronic device has a mobile display, and an integrated display arranged on a top surface of the upper portion of the stem and positioned between the spring-loaded arms of the electronic device holder, wherein the integrated display is configured to display information about the micromobility electric vehicle.

20 Claims, 15 Drawing Sheets

(56) References Cited

U.S. PATENT DOCUMENTS

| | | | |
|---|---|---|---|
| 8,525,793 B2 * | 9/2013 | Sentchenkoff | B62J 99/00 345/168 |
| 9,076,136 B2 | 7/2015 | Bettez et al. | |
| 9,269,236 B2 | 2/2016 | Bettez et al. | |
| 9,598,128 B2 | 3/2017 | Assénat et al. | |
| 9,647,712 B2 * | 5/2017 | Ryan | H04B 1/3883 |
| 2004/0198561 A1 * | 10/2004 | Corbalis | A63B 22/0605 482/57 |
| 2004/0235533 A1 * | 11/2004 | Bae | B60R 11/0241 455/569.1 |
| 2005/0267674 A1 * | 12/2005 | Suzuki | B62K 11/14 701/444 |
| 2006/0072331 A1 * | 4/2006 | Yamaguchi | B62J 35/00 362/473 |
| 2009/0240575 A1 | 9/2009 | Bettez et al. | |
| 2010/0261579 A1 * | 10/2010 | Rice | A63B 22/02 482/8 |
| 2011/0017560 A1 * | 1/2011 | Van Dyke | B60T 11/22 188/344 |
| 2011/0161141 A1 | 6/2011 | Bettez et al. | |
| 2011/0267178 A1 * | 11/2011 | Nishihara | H02J 13/0003 340/12.39 |
| 2013/0307470 A1 * | 11/2013 | Watanabe | H02J 7/025 320/108 |
| 2013/0321369 A1 * | 12/2013 | Mirski-Fitton | G09G 3/3208 345/207 |
| 2014/0125876 A1 * | 5/2014 | Nakayama | B60K 37/02 348/837 |
| 2014/0252746 A1 * | 9/2014 | Talavasek | B62J 11/00 280/288.4 |
| 2015/0014380 A1 * | 1/2015 | Oyama | B62J 11/00 224/413 |
| 2015/0055360 A1 * | 2/2015 | Hollingworth | B60Q 1/50 362/511 |
| 2015/0084364 A1 * | 3/2015 | Cha | B60J 3/0278 296/97.5 |
| 2015/0112478 A1 | 4/2015 | Bettez et al. | |
| 2015/0152668 A1 | 6/2015 | Assénat et al. | |
| 2015/0177013 A1 * | 6/2015 | Siliski | G01C 21/3423 701/433 |
| 2015/0210334 A1 * | 7/2015 | Armstrong | B62J 9/21 74/551.8 |
| 2015/0280467 A1 * | 10/2015 | Matsuda | B60L 53/30 307/10.1 |
| 2016/0145903 A1 * | 5/2016 | Taylor | B60L 7/14 701/2 |
| 2016/0221627 A1 * | 8/2016 | Hines | B62H 5/20 |
| 2016/0298974 A1 * | 10/2016 | Newlin | G06Q 10/025 |
| 2017/0029057 A1 * | 2/2017 | Kato | B62J 6/01 |
| 2017/0036722 A1 | 2/2017 | Assénat et al. | |
| 2017/0144613 A1 * | 5/2017 | Catlin | H04B 1/3877 |
| 2017/0190371 A1 * | 7/2017 | Su | A61B 5/0205 |
| 2017/0334522 A1 * | 11/2017 | Zahid | H04W 12/0802 |
| 2018/0058863 A1 * | 3/2018 | Meyer | G01C 21/3682 |
| 2018/0072374 A1 * | 3/2018 | Kishita | B62M 6/90 |
| 2018/0099713 A1 * | 4/2018 | Oste | B62J 11/00 |
| 2018/0111488 A1 * | 4/2018 | David | B60L 7/26 |
| 2018/0127042 A1 * | 5/2018 | Kerbel | B62J 6/04 |
| 2018/0162472 A1 * | 6/2018 | Gherezghiher | B62J 6/16 |
| 2018/0251080 A1 * | 9/2018 | McLaughlin | B60R 11/0241 |
| 2018/0362062 A1 * | 12/2018 | Bacallao | B62B 3/1416 |
| 2019/0071144 A1 * | 3/2019 | Wu | B62H 5/20 |
| 2019/0127002 A1 | 5/2019 | Bettez et al. | |
| 2019/0193678 A1 * | 6/2019 | Leiber | G06Q 30/0645 |
| 2019/0206009 A1 | 7/2019 | Gibson et al. | |
| 2019/0249697 A1 * | 8/2019 | Liu | H02J 7/025 |
| 2019/0291804 A1 * | 9/2019 | Yu | B62J 11/00 |
| 2019/0318419 A1 * | 10/2019 | VanderZanden | G06Q 30/0645 |
| 2019/0371504 A1 * | 12/2019 | Breiwa | F16M 13/022 |

OTHER PUBLICATIONS

U.S. Appl. No. 16/448,660, filed Jun. 21, 2019, Lambert et al.
U.S. Appl. No. 16/579,530, filed Sep. 23, 2019, Van Houten et al.
U.S. Appl. No. 16/579,556, filed Sep. 23, 2019, Van Houten et al.
U.S. Appl. No. 16/579,627, filed Sep. 23, 2019, Vandenbussche et al.
U.S. Appl. No. 29/706,673, filed Sep. 23, 2019, Van Houten et al.
U.S. Appl. No. 29/706,676, filed Sep. 23, 2019, Van Houten et al.
U.S. Appl. No. 29/706,678, filed Sep. 23, 2019, Van Houten et al.
U.S. Appl. No. 29/706,682, filed Sep. 23, 2019, Van Houten et al.
[No Author Listed], And then there was Two. Bird Two. Bird Rides, Inc. 2019. 8 pages. URL:https://two.bird.co [last accessed Sep. 26, 2019].

* cited by examiner

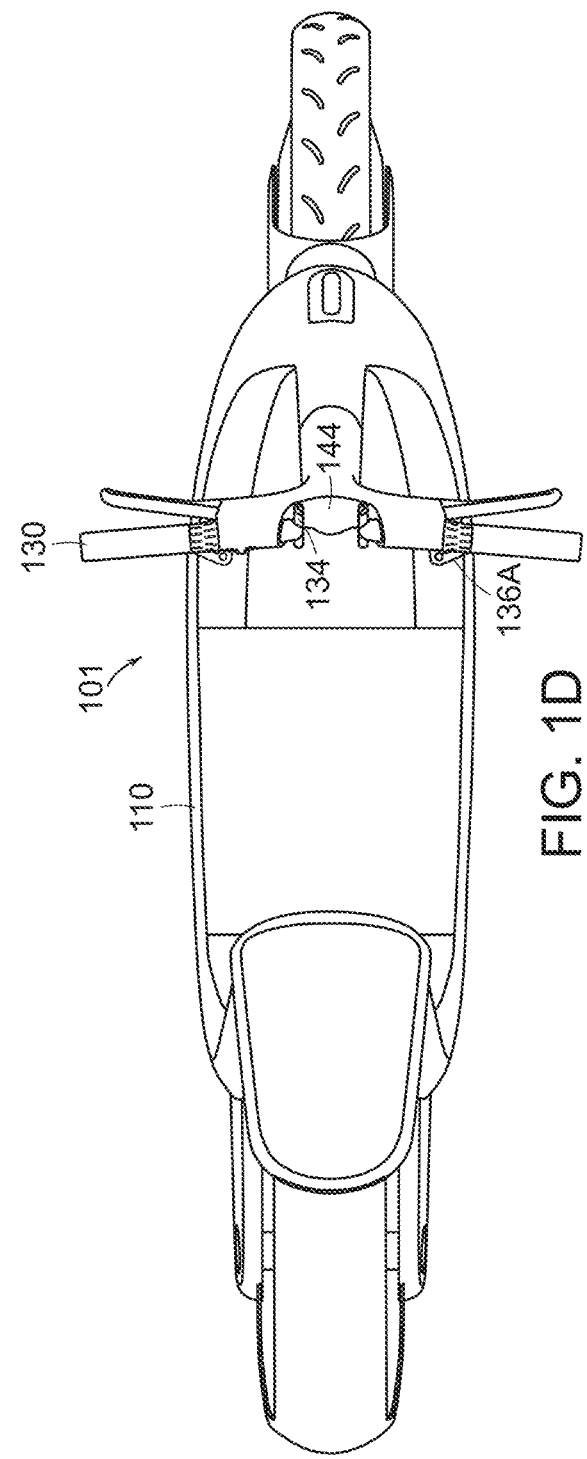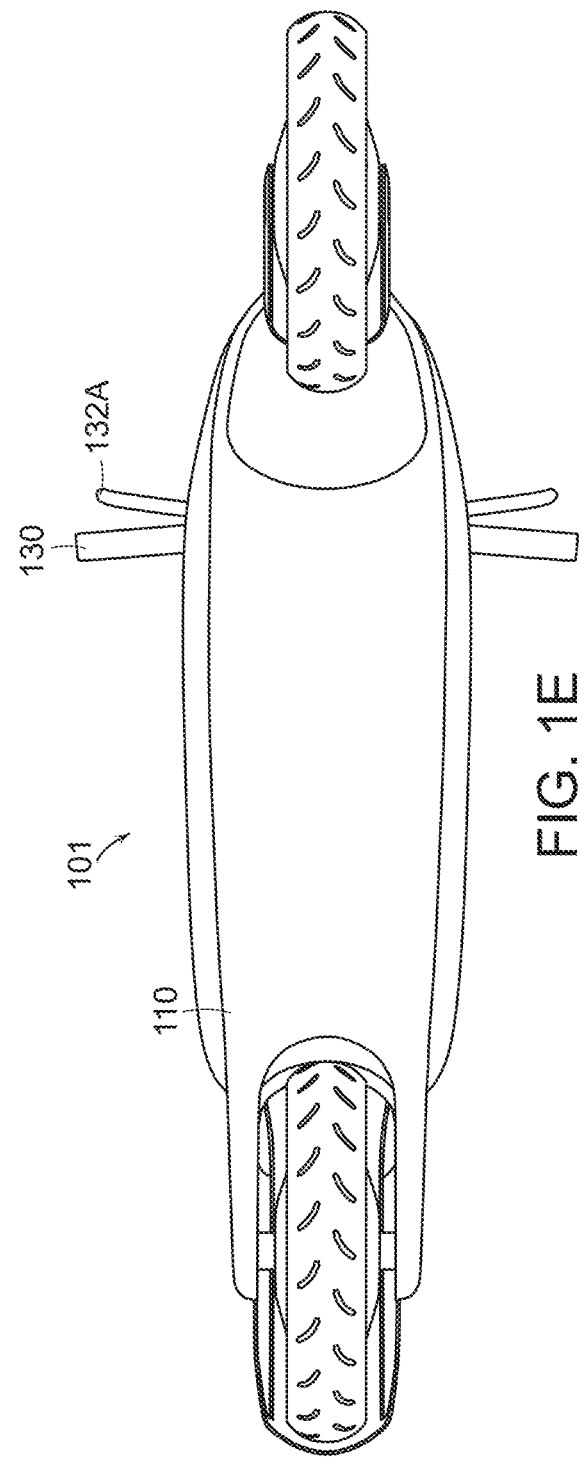

MICROMOBILITY ELECTRIC VEHICLE WITH ELECTRONIC DEVICE HOLDER AND INTEGRATED DISPLAY

BACKGROUND

Conventional transportation options in urban environments include public transportation (e.g., subways, busses), large vehicles such as cars (e.g., personal vehicles, taxis, ride-share services), bicycles, and walking. More recently, so-called "micromobility" shareable/rentable vehicles such as docked and dockless scooters and bicycles have become more common, improving access and allowing users additional options for traveling more quickly over shorter distances than walking typically allows.

SUMMARY

Having a variety of different transportation options improves users' lives by increasing mobility and enabling users to select the transportation option that works best for them on any given trip. For users desiring to travel relatively short distances (e.g., less than 5 miles), micromobility transportation options provide convenient and environmentally-friendly alternatives to car-based travel. Micromobility transportation options include human-powered vehicles (e.g., bicycles, scooters) and vehicles with electric motors (e.g., electric bicycles, electric scooters), all of which are designed to be used primarily within the traditional bicycle lane infrastructure.

Within the micromobility transportation category, different transportation options may be more suitable for certain types of trips than others. For example, while a stand-up scooter may work well for short distances, a vehicle that allows the user to be seated (e.g., a bicycle) may work better for longer distances. Micromobility vehicles with electric motors such as electric bicycles and electric scooters prevent rider fatigue and assist with navigating hilly terrain. Additionally, the purpose of each trip may dictate which type of transportation option a user selects. For example, a daily commuter carrying nothing or only a small bag may select a transportation option that emphasizes speed over stability, whereas a user traveling to a store to pick up a package or groceries may select a transportation option emphasizing package storage and security rather than speed.

The inventors have recognized that most conventional micromobility transportation options are not well suited for moderate distance (e.g., 2-5 mile) trips, which are among the most common trips in an urban environment. For example, riding a bicycle or standing on a scooter and engaging a thumb accelerator for more than 1-2 miles may become tiresome for a user, and may result in the user not selecting those transportation options for such a trip. To this end, some embodiments are directed to an electric vehicle designed to accommodate such moderate distance trips across a variety of terrains to enhance the user's experience, comfort, and enjoyment while riding the vehicle.

In some embodiments, a micromobility electric vehicle may comprise handlebars coupled to an upper portion of a stem and configured to steer the vehicle, an electronic device holder having spring-loaded arms that retract at least partially into the handlebars, wherein the spring-loaded arms are configured to apply a force against edges of an electronic device when arranged between the spring-loaded arms, wherein the electronic device has a mobile display, and an integrated display arranged on a top surface of the upper portion of the stem and positioned between the spring-loaded arms of the electronic device holder, wherein the integrated display is configured to display information about the micromobility electric vehicle.

In some embodiments, a method of operating a micromobility electric vehicle may comprise receiving an electronic device comprising a mobile display between a first spring-loaded arm and a second spring-loaded arm, retaining the electronic device between handlebars of the micromobility electric vehicle via force exerted on edges of the electronic device by the first spring-loaded arm and the second spring-loaded arm, wirelessly receiving information about operation of the micromobility electric vehicle, and rendering on the mobile display the received information.

In some embodiments, a micromobility electric vehicle may comprise handlebars coupled to an upper portion of a stem and configured to steer the vehicle, one or more sensors configured to determine a current interaction state between a user and the micromobility electric vehicle, and an integrated display arranged on a top surface of the upper portion of the stem, wherein the integrated display is configured to display information about the micromobility electric vehicle, wherein the information is determined, at least in part, on the current interaction state.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

FIG. 1D illustrates a top view of the electric vehicle of FIG. 1A;

FIG. 1E illustrates a bottom view of the electric vehicle of FIG. 1A;

DETAILED DESCRIPTION

Figure 1A:
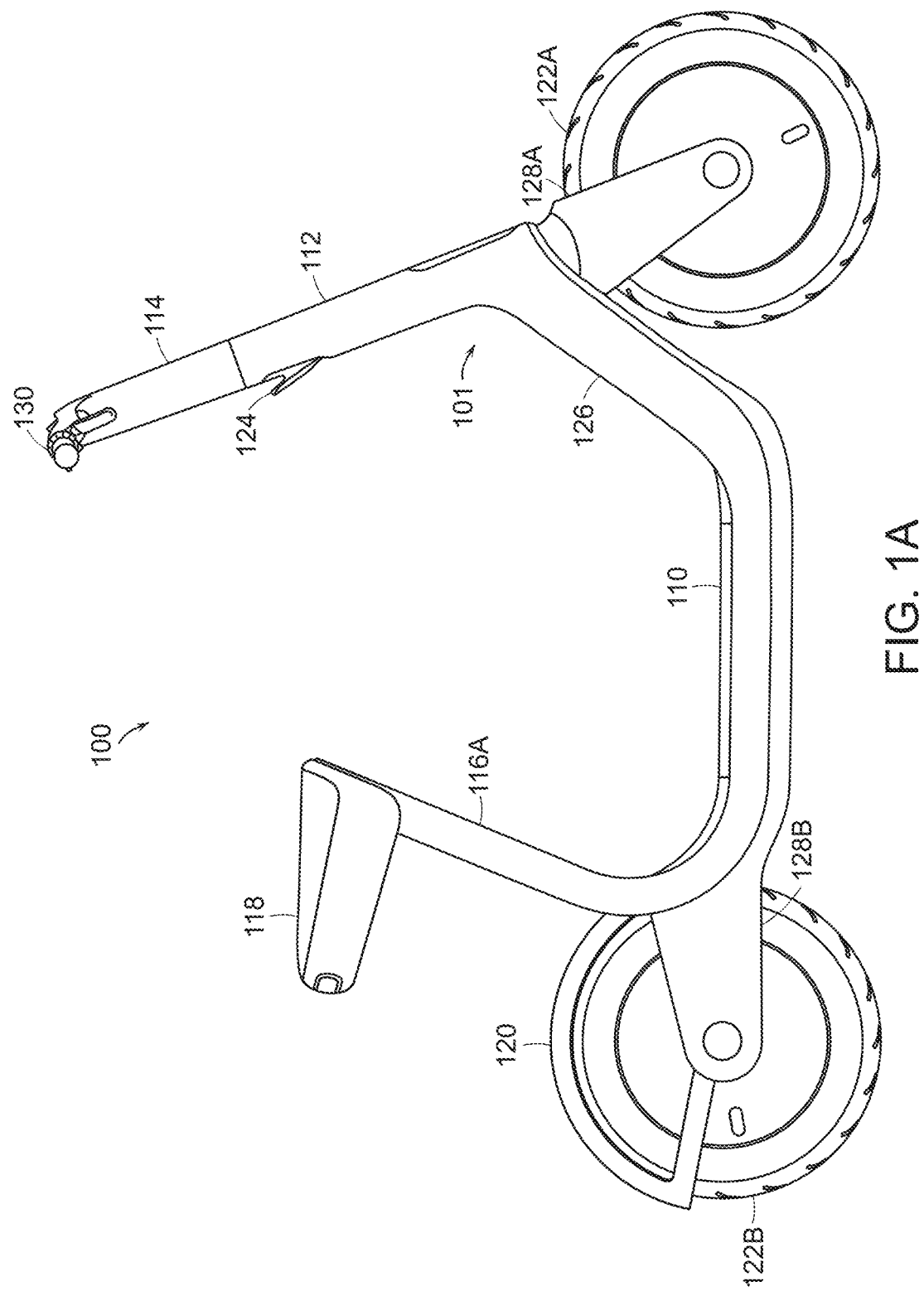
FIG. 1A illustrates a side view of an electric vehicle in accordance with some embodiments.
Figure 1B:
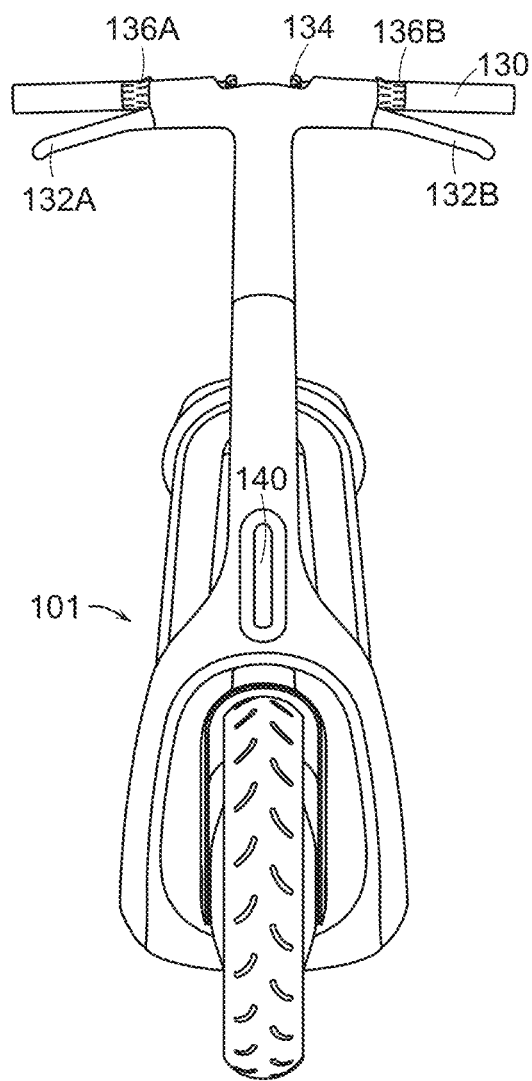
FIG. 1B illustrates a front view of the electric vehicle of FIG. 1A.
Figure 1C:
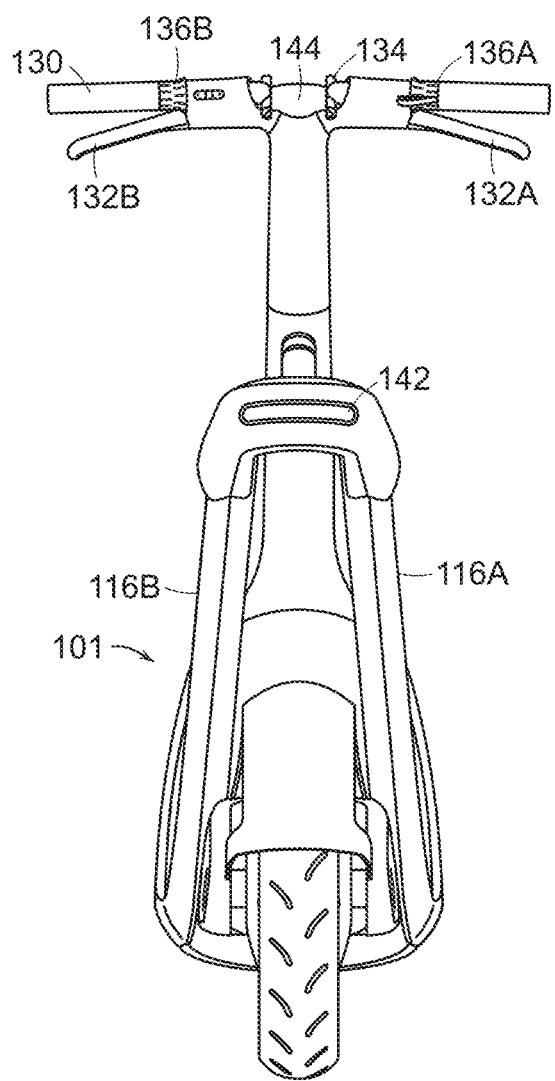
FIG. 1C illustrates a rear view of the electric vehicle of FIG. 1A.

As discussed briefly above, most conventional micromobility transportation options are designed for short distance (e.g., 0-2 mile) trips, and are less comfortable for the user when used for moderate distance (e.g., 2-5 mile) trips. Some embodiments are directed to a micromobility electric vehicle and one or more features thereof that provide a safe, reliable, and approachable user experience for moderate distance trips. These electric vehicles may be accessible as part of a shared vehicle model in which riders do not have a personal vehicle, but instead interact with a dynamic matching system to access, under a rental or subscription model, any of numerous such electric vehicles deployed throughout a region, such as a city.

The inventors have recognized and appreciated that a user's experience with an electric vehicle may be enhanced by providing the user with useful information at different states of the user's interaction with the vehicle. As described in further detail below, some embodiments include an integrated display configured to display information about the electric vehicle to enhance a user experience.

Mobile electronic devices including, but not limited to, smartphones have become ubiquitous in society. It has been appreciated that the user experience with an electric vehicle, such as a scooter, may be enhanced by integrating an electronic device holder with the electric vehicle that securely holds an electronic device (e.g., a smartphone or other mobile electronic device). When secured in the electronic device holder, the electronic device may display information associated with the electric vehicle to facilitate the user's interaction with the vehicle. As described in more detail below, the information displayed on the electronic device may be different than the information displayed on the display integrated with the electric vehicle to provide an enhanced user experience via the display on the electronic device.

FIGS. 1A-E illustrate a side view, a front view, a rear view, a top view, and a bottom view, respectively, of an electric vehicle 100 in accordance with some embodiments. In the illustrated embodiment, electric vehicle 100 is a two-wheeled vehicle with a front wheel 122A and a rear wheel 122B mounted on axles supported by fork 128A or 128B, respectively. Either or both of wheels 122A and 122B may be driven by an electric motor, which may have a stator mounted to one of the forks and a rotor coupled to the axle.

Batteries and control electronics may be mounted on board electric vehicle 100. In some embodiments, batteries and associated controllers may be mounted within a compartment coupled to a frame 101 of electric vehicle 100. For example, electric vehicle 100 includes a footboard 110. Footboard 110 may have upper and lower surfaces that are separated to create a compartment in which a battery and motor controller may be installed. The compartment may have one or more security features. For example, batteries may be removable, but may be locked in the compartment unless released by a key or special tool. Footboard 110 may have a bottom (e.g., flat) portion 111 arranged between the front wheel 122A and the rear wheel 122B and an angled portion 126. In some embodiments, the bottom portion 111 may be horizontal (e.g., parallel to a ground surface). However, in other embodiments, the bottom portion 111 may be inclined relative to a ground surface. For example, the bottom portion may be inclined relative to a ground surface if the front wheel 122A and rear wheel 122B are different sizes. The angled portion 126 may be configured to accommodate storage and operate, at least in part, as a fender for the front wheel 122A so that a separate fender (e.g., fender 120 shown covering a portion of the rear wheel 122B) may not be required for the front wheel 122A.

Electric vehicle 100 includes a column 112 coupled to the angled portion 126 of the footboard 110 and a stem 114 rotatably coupled to the column 112. Stem 114 may have handlebars 130 at one end and may be attached at the other end to front fork 128A such that rotation of the handlebars 130 turns the fork 128A and front wheel 122A with it. Column 112 may include a channel to allow cabling (e.g., for brakes, a throttle, electronics, etc.) to be placed internal to the column.

Electric vehicle 100 also includes seat 118, which is coupled to footboard 110 by seat supports 116A and 116B. In some embodiments, footboard 110, column 112, and seat supports 116A and 116B may form a continuous frame 101 that is not adjustable. For example, the frame may be formed of one continuous piece of material and/or may include multiple pieces of material that are welded, bolted or otherwise rigidly attached to prevent adjustment of the pieces relative to each other.

In some embodiments, the frame members by be tubular, with varying cross section. The cross section of the various frame members may be established based on functional as well as aesthetic considerations. For example, angled portion 126 may have a cross section that is elongated in a direction perpendicular to a surface on which wheels 122A, 122B rest. Such a configuration may provide a rim around portions of the footboard, creating a space along the angled portion 126 of the footboard for storage of items, and providing a finished and aesthetically pleasing appearance for electric vehicle 100, without separate body panels. Further, the rim may provide visual clues to riders how electric vehicle 100 can be used even when the rider needs to transport parcels, making the vehicle approachable.

Other features alternatively or additionally may be included on electric vehicle 100 to make the vehicle desirable for use on moderate distance trips. In some embodiments, column 112 may include a hook 124 configured to enable a loop, strap, or other portion of a personal item (e.g., a bag, backpack, package) to be secured to the vehicle. Collectively, the hook 124 and the angled portion 126 of the footboard may provide a storage area on the vehicle. Hook 124 may be adjustable such that it forms an angle relative to column 112 only when in use (e.g., when a bag is attached thereto) and retracts into column 112 when not in use.

As a further example of features that make electric vehicle 100 desirable for use on moderate distance trips, multiple user interface elements may be mounted to the upper end of stem 114, facing a user riding the vehicle. In the illustrated embodiment, stem 114 has attached thereto handlebars 130 configured to steer the vehicle when in use by rotating the stem 114 relative to the column 112. Brake levers 132A and 132B are configured to be proximate to handlebars 130 and are coupled to braking components located near the wheels 122A and/or 122B by brake cables located, for example, within column 112. Handlebars 130 also include throttle 136A and 136B configured to provide acceleration to the electric vehicle when engaged, for example, by rotating the throttle around an axis along the length of the handlebars 130. Although throttle 136A and 136B is shown as a rotatable component, in some embodiments, throttle 136A and 136B may additionally or alternatively include components that allow for control of the throttle without requiring rotation. For example, throttle 136A and/or 136B may include one or more thumb-based controls that enable manipulation of the throttle without requiring rotation. Additionally, throttle 136A and 136B may be arranged on both right and left handlebars 130 as shown, or alternatively, the throttle may be arranged on only one side of the handlebars 130 (e.g., only throttle 136A arranged on the right side handlebar may be present without a corresponding throttle 136B on the left side handlebar).

In some embodiments, handlebars 130 also include electronic device holder 134 configured to grasp a portable electronic device, such as a smartphone. In some embodiments, electronic device holder 134 comprises spring-loaded arms that retract, at least in part, into the handlebars 130 such that, when a portable electronic device is arranged between the spring-loaded arms, the electronic device holder 134 grips the device using forces (e.g., spring-based forces) applied by the spring-loaded arms against the edges of the device in the holder. A smartphone may thus be held such that its display is visible to the user of the electric vehicle 100 or such that sound output by its speakers is audible to the user. Although the electronic device holder 134 shown in FIGS. 1A-E is configured with horizontally-positioned arms, in other embodiments the portion of the electronic device holder 134 configured to provide spring-based forces to retain the electronic device may be oriented in a manner other than horizontal (e.g., vertically oriented). In some embodiments, the orientation of electronic device holder 134 may be configurable, for example, by rotating the electronic device holder.

A smartphone or other mobile device may be wirelessly coupled to control electronics of the electric vehicle 100, either through short range wireless communication (e.g., near field communication, Bluetooth, etc.) with control electronics on the vehicle or through connection over a wide area network to a server exchanging information with control electronics on the vehicle. With such wireless coupling, the smartphone may provide a robust interface through which the user may provide or receive commands or information about the state of a vehicle during a trip. Further, the smartphone may have access to a cellular data network, GPS sensors and other sources of information, which can enable the user interface to display navigation or other information other than about the vehicle state per se that might be useful for a user. Such interfaces may be controlled by an app on the smartphone, enabling robust interfaces, which may be intuitive for a user to access and configure and/or can be provided along with guidance on configuring and accessing those user interfaces. In embodiments in which the electric vehicle is part of a vehicle sharing system in which vehicles are rented by users via a smartphone app, the app through which a user arranges for rental of a specific vehicle may control display of user interfaces associated with that vehicle, further making the vehicle accessible to users.

In some embodiments, a top surface of the stem 114 includes a display 144 arranged between the spring-loaded arms of the electronic device holder 134. The display 144 may be configured to display information about the electric vehicle. For example, display 144 may be configured to show a battery charge state of the vehicle, a predicted remaining range of the vehicle, maintenance information (e.g., tire pressure) related to the vehicle, a length of time that the vehicle has been operated, current charges associated with the operation of the vehicle when the vehicle is a shared vehicle, or any other suitable information. Display 144 may also be configured to show other information unrelated to the vehicle, but that the user may find useful during operation of the vehicle, such as time information and map or navigation information. When a portable electronic device (e.g., a smartphone) is secured by electronic device holder 134, display 144 may not be visible to the user due to the relative arrangement of electronic device secured by the electronic device holder 134 and the display 144. In such an instance, the display of the electronic device may present the same, different, or additional information that the display 144 is configured to present. In some embodiments, the display of the electronic device may be configured to present, e.g., via an app on the device, additional information to provide an enhanced user experience during operation of the vehicle. Additionally, the display 144 may be turned off or dimmed when an electronic device is secured in electronic device holder 134 to save power.

Electric vehicle 100 further includes lights 140 and 142 arranged on the front and rear of the vehicle. Front light 140 may be configured, at least in part, as a headlight for providing illumination of the roadway and to signal the presence of the vehicle to oncoming vehicular and non-vehicular traffic. Rear light 142 may be configured, at least in part, as a brake light to indicate to others behind the vehicle when the user of the vehicle has applied the brakes. Rear light 142 may also include one or more indicators for turn signals when the electric vehicle is configured to use turn signal indicators. In some embodiments, lights 140 and 142 are configured to display information about the vehicle, for example, when the user approaches the vehicle and/or starts the vehicle. For example, one or both of the lights may turn on and/or flash in a predetermined sequence upon starting the vehicle. Additionally, although shown as single lights 140 and 142 located on the front and rear of the vehicle respectively, it should be appreciated that each light assembly may include multiple lights having different characteristics (e.g., colors) and may be controlled independently or together.

Figure 2:
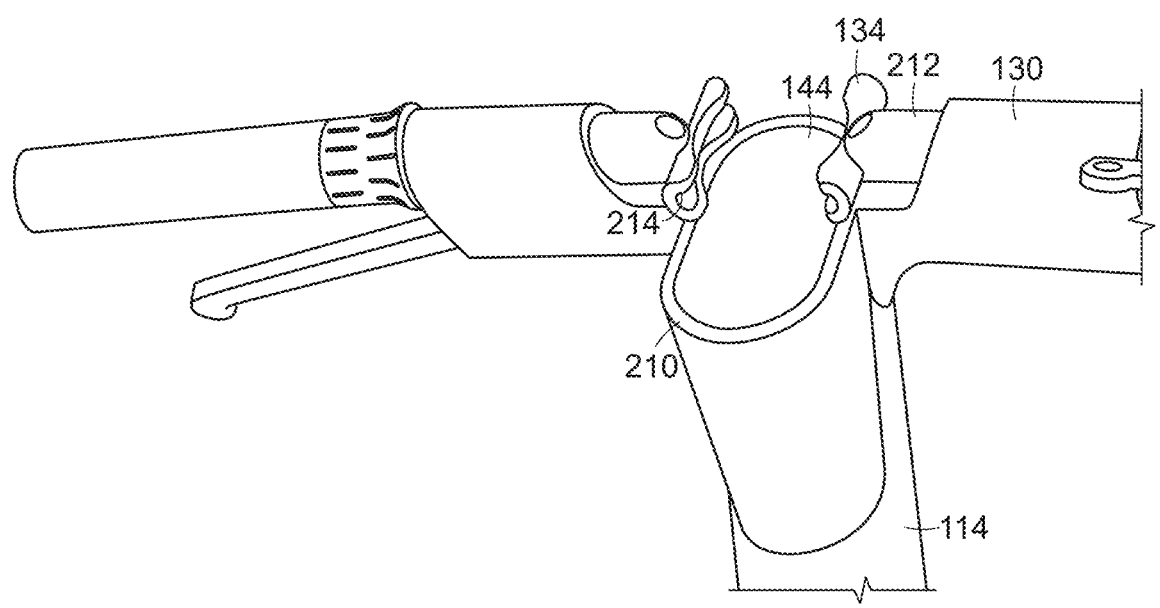
FIG. 2 illustrates a portion of an electric vehicle that includes an electronic device holder and an integrated display in accordance with some embodiments.

FIG. 2 illustrates a portion of an electric vehicle that includes an electronic device holder 134 and an integrated display 144 arranged on a top surface 210 of stem 114. The electronic device holder 134 includes spring-loaded arms 212 configured to retract into the handlebars 130. As shown, the electronic device holder 134 includes a pair of retractable spring-loaded arms 212 that apply a spring-based force on edges of an electronic device (e.g., a smartphone) arranged between the pair of retractable arms. To prevent damage to an electronic device, the electronic device may be arranged at least partially inside of a case. In such situations, the spring-loaded arms 212 of the electronic device holder 134 may apply a force against the edges of the case rather than the electronic device itself. Any suitable amount of force may be applied by the spring-loaded arms 212 to secure an electronic device in holder 134. For example, a force sufficient to secure the electronic device even when one or more of the wheels of the electric vehicle is off the ground (e.g., when the electric vehicle is secured into a dock station), may be used. As shown, the electronic device holder 134 may include grooves 214 that may further help secure an electronic device in the holder 134. The grooves 214 may be any suitable shape or size. The spring-loaded arms 212 of the electronic device holder 134 allow for a wide range of electronic devices having different sizes and configurations to be secured in the holder 134 without reconfiguration of the holder (e.g., by having to manually adjust the position of the arms to secure the device in the holder) providing for an intuitive user experience.

Integrated display 144 is positioned between the spring-loaded arms 212 of the electronic device holder 134 on a top surface 210 of stem 114. Due the relative position of integrated display 144 and electronic device holder 134, display 144 is at least partially hidden from the user's view when an electronic device is secured in the electronic device holder. As shown, display 144 may be configured to show information about the electronic vehicle to facilitate a user's experience of interacting with the electric vehicle. For example, in the example shown in FIG. 2, the display includes step-by-step instructions to inform the user how to unlock the electric vehicle to begin a trip. Other information, including, but not limited to, the current battery status of the vehicle and an availability status of the vehicle may additionally or alternatively be shown on display 144. As described in more detail below, in some embodiments, the information displayed on display 144 may be determined, at least in part, on an interaction state (e.g., pre-ride, in-ride, post-ride) of the user with the electric vehicle. In some embodiments, integrated display 144 uses electrophoretic display technology (e.g., available from E-Ink Corporation, Hsinchu, Taiwan) that provides for a low-power high-contrast display across multiple outdoor lighting environments.

Figure 3:
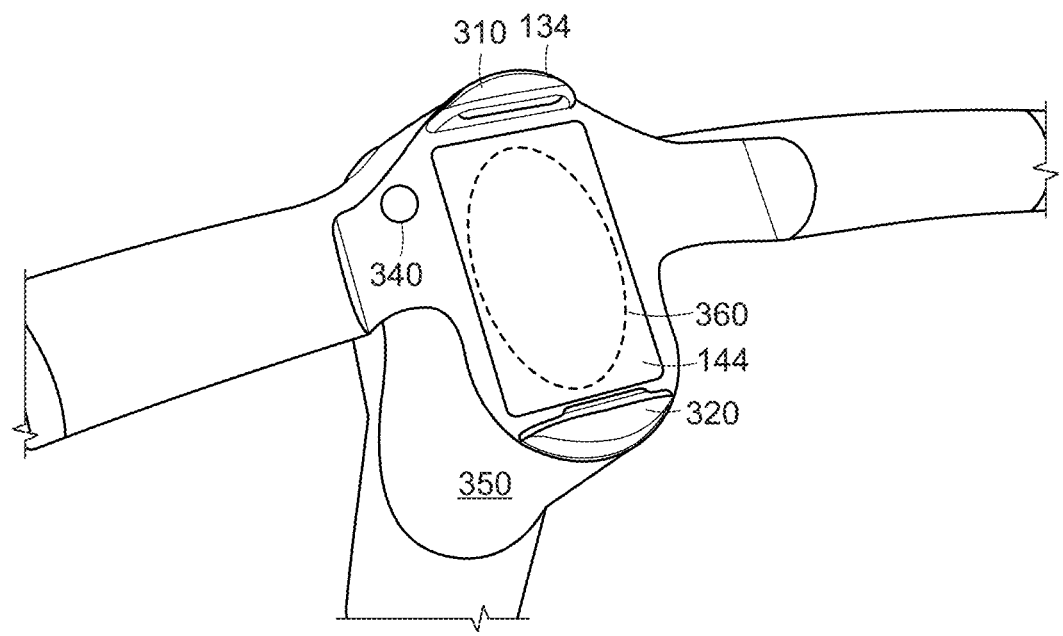
FIG. 3 illustrates an alternate design for an electronic device holder for an electric vehicle in accordance with some embodiments.

FIG. 3 illustrates an alternate design of an electronic device holder 134 incorporated with an electric vehicle in accordance with some embodiments. Rather than including spring-loaded arms that provide horizontal forces against the edges of an electronic device to secure the device in the holder, as just described for the embodiment shown in FIG. 2, the embodiment shown in FIG. 3 includes a top portion 310 and a bottom portion 320. One or both of the top and bottom portions of the electronic device holder 134 shown in FIG. 3 may be movable and may include one or more hinges and/or springs to enable an electronic device of varying sizes and shapes to be secured within the holder. For example, top portion 310 of the holder 134 may be fixed (i.e., not-movable), whereas bottom portion 320 of the holder 134 may be hinged to enable the distance between the top and bottom portions of the holder 134 to be increased to facilitate placement of an electronic device between the top and bottom portions of the holder.

Similar to the embodiment shown in FIG. 2, the embodiment shown in FIG. 3 also includes an integrated display 144 arranged on a top surface of a stem of the electric vehicle. The integrated display 144 and the electronic device holder 134 are positioned relative to each other such that the display 144 is at least partially hidden when an electronic device is secured in the electronic device holder 134.

Also shown in FIG. 3 is a light sensor 340 configured to measure ambient light. As discussed in further detail below, one or more characteristics of the display 144 may be adjusted based on ambient lighting conditions to provide for an improved user experience. For example, the brightness, contrast, and/or other display characteristics of the display 144 may be determined based, at least in part, on an ambient light measurement by light sensor 340. The placement of light sensor 340 on the electric vehicle shown in FIG. 3 is provided merely for illustrative purposes, and it should be appreciated that light sensor 340 may be placed at any suitable position on the electric vehicle to measure ambient light characteristics. Additionally, although light sensor 340 is not illustrated on the embodiment shown in FIG. 2, it should be appreciated that a light sensor 340 may be used with an electronic device holder having the horizontal configuration shown in FIG. 2, the vertical configuration shown in FIG. 3 or any other configuration.

It has been appreciated that many electronic devices include wireless charging technology and that it would be advantageous to be able to wirelessly charge an electronic device during use of the electric vehicle. Furthermore, it has been appreciated that incorporating a wireless power charging capability into an electric vehicle may encourage potential users to use the electric vehicle if they know that their electronic device will be charged by the time they reach their destination. Accordingly, some embodiments include a wireless power transmitter 360 arranged proximal to the top surface of the stem of the electric vehicle such that a battery of an electronic device secured by the electronic device holder 134 is wirelessly charged by the wireless power transmitter 360 using, for example, inductive coupling between the wireless power transmitter 360 and a wireless power receiver in the electronic device. Additionally, although wireless power transmitter 360 is not illustrated on the embodiment shown in FIG. 2, it should be appreciated that a wireless power transmitter 360 may be used with any electric vehicle having an electronic device holder configured to secure an electronic device in a close proximity to the wireless power transmitter 360.

Figure 4:
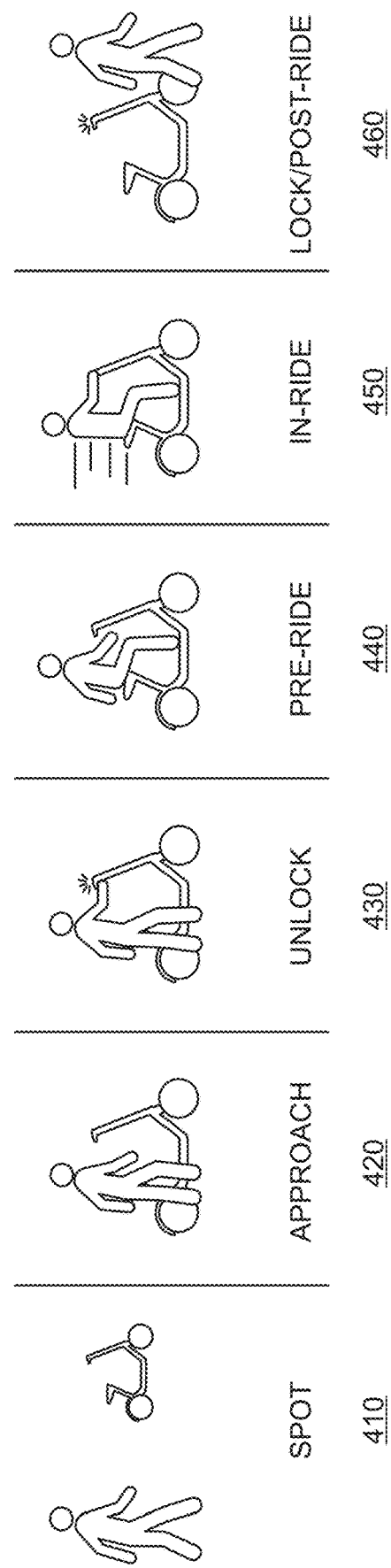
FIG. 4 schematically illustrates states of interaction between a user and an electric vehicle in accordance with some embodiments.

It has been appreciated that it may be beneficial to provide a user with different information on display 144 (or a display on the user's mobile electronic device) at different states of interaction between the user and the electric vehicle. FIG. 4 shows six different interaction states between a user and an electric vehicle. In interaction state 410, the user has not yet engaged with the vehicle, but may be, for example, walking near the vehicle. In state 410, one or more sensors on the vehicle may detect that the user is in the vicinity of the vehicle, and the lights 140, 142, display 144 or some other portion of the electric vehicle may be controlled to draw attention to the vehicle, thereby encouraging the potential user to notice the vehicle and consider using it for a trip.

In interaction state 420, the user has approached the vehicle, but may not yet have decided to use the vehicle. In state 420, the display 144 may be configured to display information on how to unlock the vehicle (e.g., the information shown on the display of FIG. 2) using an electronic card or some other authentication technique (e.g., using an application on the user's smartphone). Information about whether the vehicle is available, reserved, or out of service may also be provided in state 420 to let the user know whether the vehicle is available for use.

Figure 10:
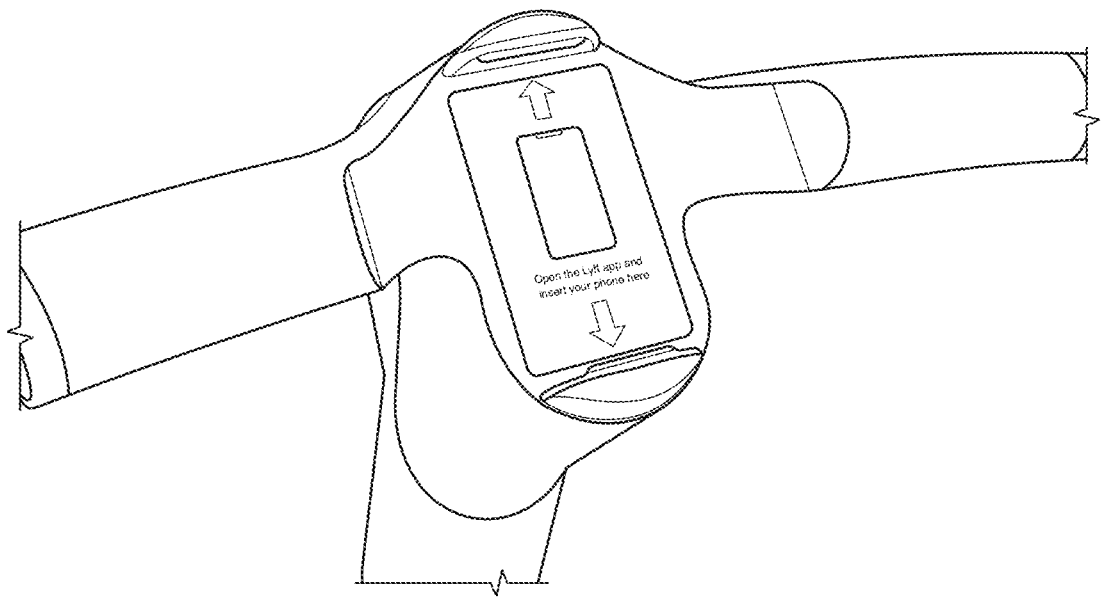
FIG. 10 illustrates information presented on an integrated display in association with electronic card reader functionality in accordance with some embodiments.

In interaction state 430, the user is in the process of authenticating/unlocking the vehicle for use. Display 144 may be configured to display information about the locked status of the vehicle. For example, if the user attempts to unlock the vehicle, but the attempt is unsuccessful, display 144 may be configured to display help information to the user describing the reason why the attempt was not successful and to provide instructions on how to successfully unlock the vehicle. An example of unlocking information displayed in unlock state 430 is shown in FIG. 10.

Figure 7:
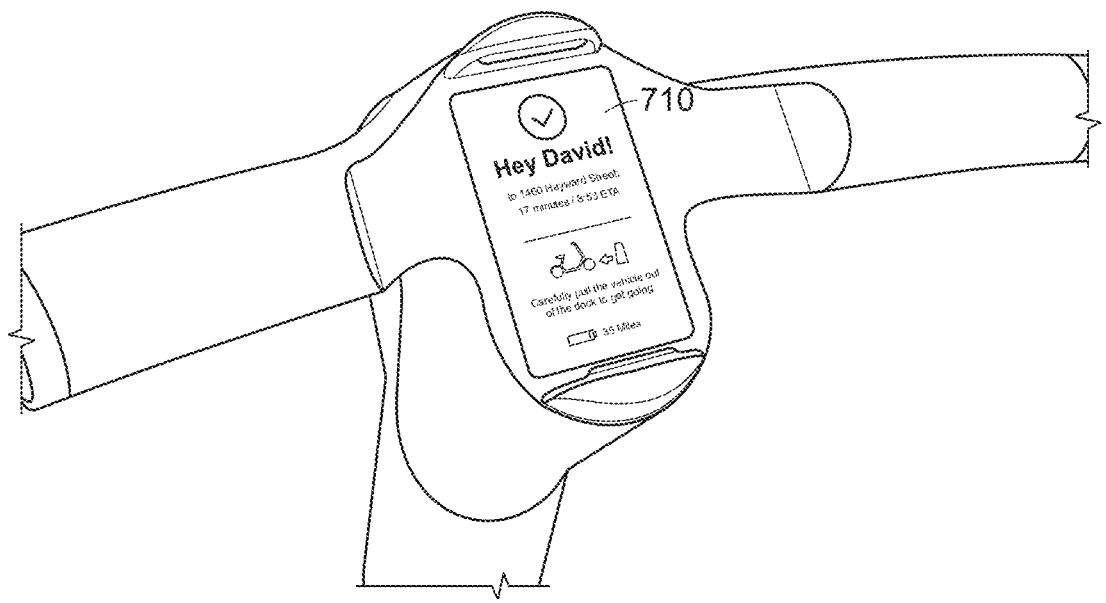
FIG. 7 illustrates information presented on an integrated display during a pre-ride interaction state in accordance with some embodiments.

In interaction state 440, the user has successfully unlocked the vehicle, but has not yet started to ride the vehicle. In state 440, the display 144 may be configured to provide vehicle information to the user, such as battery charge information, safety information, navigation information to enable a user to enter a destination, instructions on operating the vehicle (e.g., throttle and braking), etc. An example of pre-ride information displayed in pre-ride state 440 is shown in FIG. 7. In particular, the display shown in FIG. 7 includes personalized information 710, for example, that identifies the user of the electric vehicle. By providing personalized information, the display is configured to show the user the specific vehicle that is matched for him/her.

Figure 8:
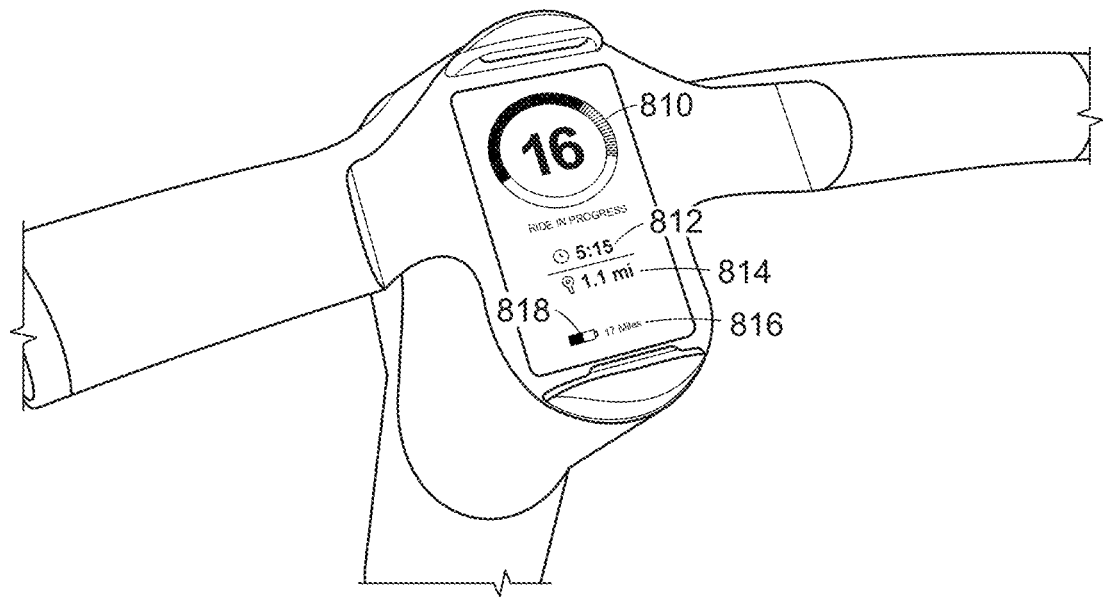
FIG. 8 illustrates information presented on an integrated display during an in-ride interaction state in accordance with some embodiments.

In interaction state 450, the user has started to ride the electric vehicle to a desired destination. Display 144 may be configured to display information about the operation of the vehicle during the trip including, but not limited to, vehicle speed information, vehicle range information, trip length, time to destination, and turn-by-turn direction information. An example of in-ride information that may be displayed during in-ride state 450 is shown in FIG. 8. In particular, the display shown in FIG. 8 includes speed information 810 showing a current speed of the vehicle, destination information including time-to-destination information 812 and distance to destination information 814, and vehicle information describing the current state of the electric vehicle. For example, as shown vehicle information includes remaining distance information 816 and battery charge information 818. It should be appreciated that other information may additionally or alternatively be shown as in-ride information.

In interaction state 460, the user has completed their use of the vehicle and is in the process of locking the vehicle. Display 144 may be configured to show information related to the lock status of the vehicle, trip information (e.g., distance traveled, duration of trip, charges associated with trip, experience survey information, etc.), or any other suitable post-ride information.

Figure 5:
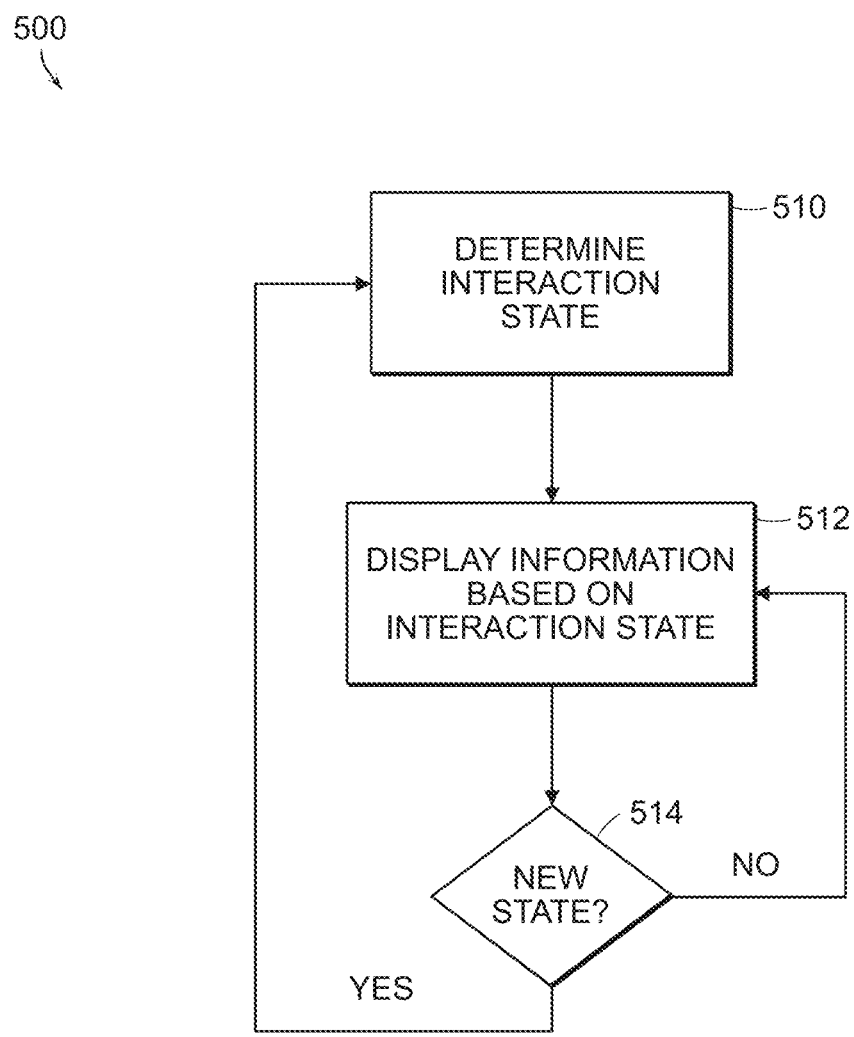
FIG. 5 is a flowchart of a process for displaying information based on an interaction state in accordance with some embodiments.

As should be appreciated from the foregoing, content presented on integrated display 144 may be determined based, at least in part, on a current interaction state of the user with the electric vehicle. FIG. 5 illustrates a process 500 for determining content to display on an integrated display of an electric vehicle based, at least in part, on an interaction state between a user and the electric vehicle in accordance with some embodiments. In act 510, the current interaction state is determined based, for example, on one or more sensors located on the vehicle. For example, the electric vehicle may include at least one near field communication (NFC) sensor, one or more cameras, and/or or one or more other types of short range sensors configured to determine when a user is located near the vehicle to determine that the user is interaction state 410 or interaction state 420. The electric vehicle may include one or more sensors in seat 118 or footboard 110 to detect that the user is present/not present on the vehicle to determine that the user is in a pre-ride interaction state (e.g., state 440) or a post-ride state (e.g., state 460). The electric vehicle may include control electronics configured to measure information about the operating state of the vehicle (e.g., vehicle speed), which may be used to determine that the user is currently riding the vehicle in the in-ride state 450.

Figure 6:
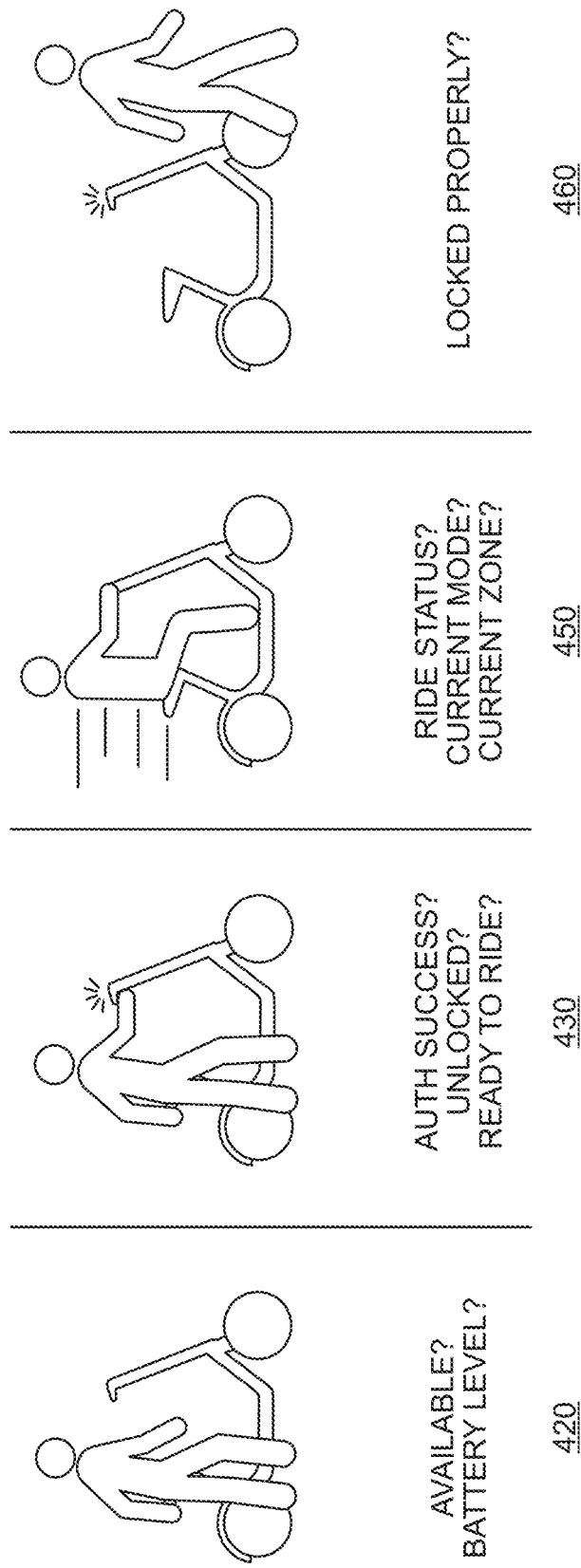
FIG. 6 schematically illustrates examples of information that may be displayed based on an interaction state in accordance with some embodiments.

Process 500 then proceeds to act 512, where information is presented on display 144 and/or the display of a user's electronic device secured in electronic device holder 134 based, at least in part, on the determined interaction state. FIG. 6 describes examples of types of information that may be displayed for three different interaction states. As shown in FIG. 6, in the pre-ride interaction state 420, information related to availability of the vehicle (e.g., whether reserved, available, out of service, etc.) and vehicle characteristics (e.g., battery level, predicted range information) may be displayed to the user to help the user decide whether to use the vehicle for their desired trip. When it is determined that the user is attempting to unlock the vehicle (e.g., interaction state 430), information related to the success of the authentication/unlocking process, information about whether the vehicle is ready to ride, safety information, personalized information, or any other suitable pre-ride information may be displayed. When it is determined that the user is in the process of riding the vehicle (e.g., interaction state 450), information about the ride status, the mode of operation, range information, navigation information, information about whether the vehicle is out of a designated zone, or any other suitable in-ride information may be displayed. When it is determined that the user has completed their use of the vehicle (e.g., interaction state 460), information related to the lock status of the vehicle or any other post-ride information may be displayed.

Returning to process 500 of FIG. 5, after appropriate content has been displayed based on the current interaction state, the process proceeds to act 514, where it is determined whether the interaction state has changed to new state. When it is determined that the interaction state has changed, the process returns to act 510 where the new interaction state is determined. It should be appreciated that detection of a new state and determination of the new state may occur at the same time (e.g., if the user engages the throttle it may be determined that the interaction state has changed and specifically that the state has transitioned from a pre-ride state to an in-ride state). When it is determined in act 514 that the state has not changed, the process returns to act 512 where information for the current state continues to be displayed to the user until it is determined in act 514 that the interaction state has changed. Detecting whether the interaction state has changed may occur continuously, periodically (e.g., every minute, every 5 minutes), or in response to an event occurring (e.g., change in pressure on a seat sensor, engagement of throttle, etc.).

Figure 9:
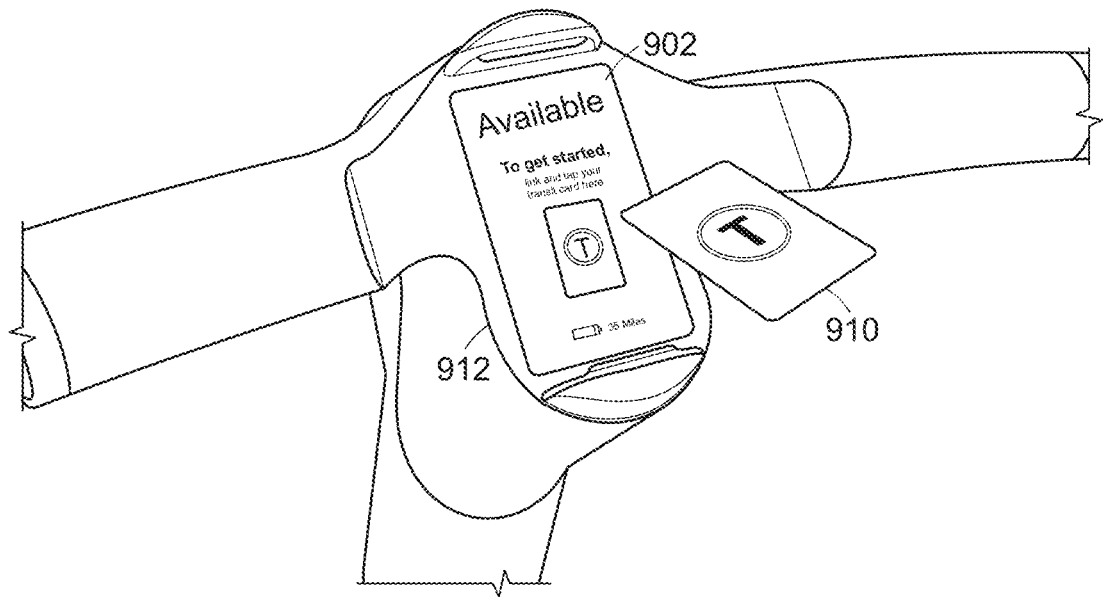
FIG. 9 illustrates electronic card reader functionality integrated with an electric vehicle in accordance with some embodiments.

It has also been appreciated that the user experience with an electric vehicle may be further enhanced by providing a convenient interface for authenticating/unlocking the electric vehicle for use. To this end, some embodiments include an electronic card reader 912 configured to read an electronic card 910 as shown in FIG. 9 to authenticate and/or unlock the electric vehicle. The electronic card reader may use radio-frequency signals, near field communication (NFC) signals, or any other suitable short range communication technology. Some embodiments include multiple authentication/unlocking techniques. For example, the vehicle may be unlocked using an electronic card or using an application on the user's smartphone. For example, the user's electronic device (e.g., smartphone) may communicate via Bluetooth or another short-range protocol with electronics onboard the electric vehicle to perform authentication/unlocking of the vehicle when the electronic device is within a particular range of the vehicle or when the electronic device is secured in the electronic device holder 134. As shown in FIG. 9, the display may also include availability information 902 indicating an availability of the electric vehicle. In some embodiments the availability information 902 may indicate to the user whether the vehicle is available, reserved, or out of service.

Figure 11:
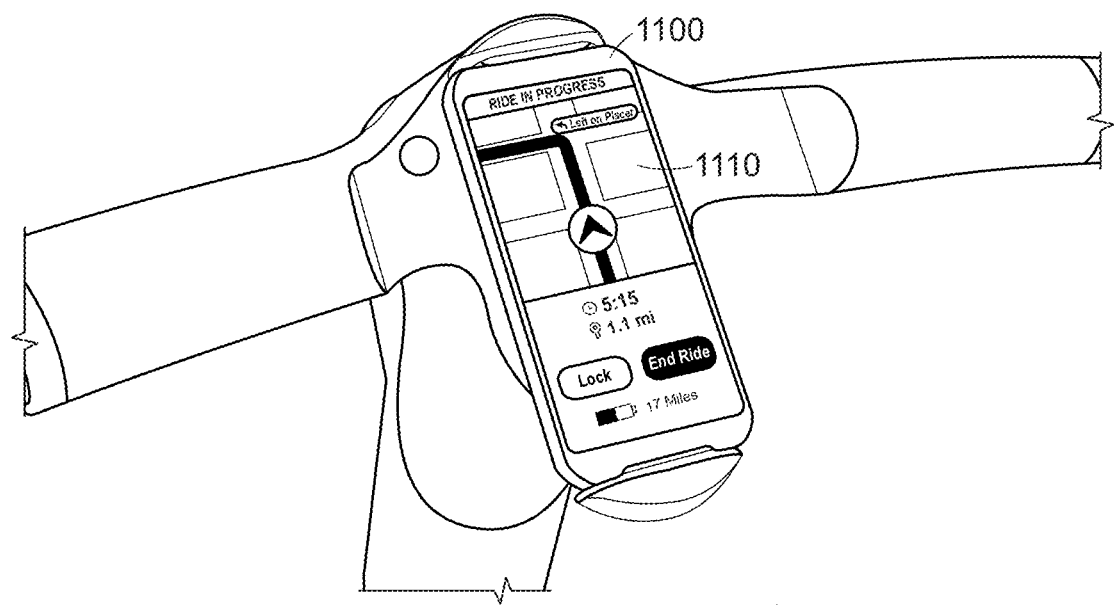
FIG. 11 illustrates a portion of an electric vehicle when an electronic device is secured in an integrated electronic device holder in accordance with some embodiments.

FIG. 11 illustrates an example of an electronic device 1100 secured in electronic device holder 134 during an in-ride interaction state. As shown, the electronic device 1100 is configured to display detailed navigation information 1110 on the display of the electronic device. In some embodiments, the integrated display 144 may be configured to provide information using, for example, a low-power monochromatic interface capable of providing simple instructions. Providing more detailed information on the display of an electronic device when secured in the electronic device holder 134 may provide the user with an enhanced user experience than achievable with the information capable of being presented on the integrated display 144. In some embodiments, the navigation information provided on the display of the electronic device 1100 may include bike lane information directing the user to an appropriate bike lane to ride the electric vehicle.

As shown, when the electronic device 1100 is present in the electronic device holder 134, the integrated display 144 is at least partially hidden from view. It has been appreciated that when the integrated display 144 is at least partially hidden from view, the display 144 may be configured to automatically become "disabled" (e.g., operate in a low-power mode or be turned off) to further preserve battery power of the electric vehicle. In some embodiments, when the display 144 content to be displayed on the display is not updated while the electronic device 1100 is present in the electronic device holder 134. Once the electronic device 1100 is removed from the electronic device holder 134, display 144 may return to its normal operating mode.

Figure 12:
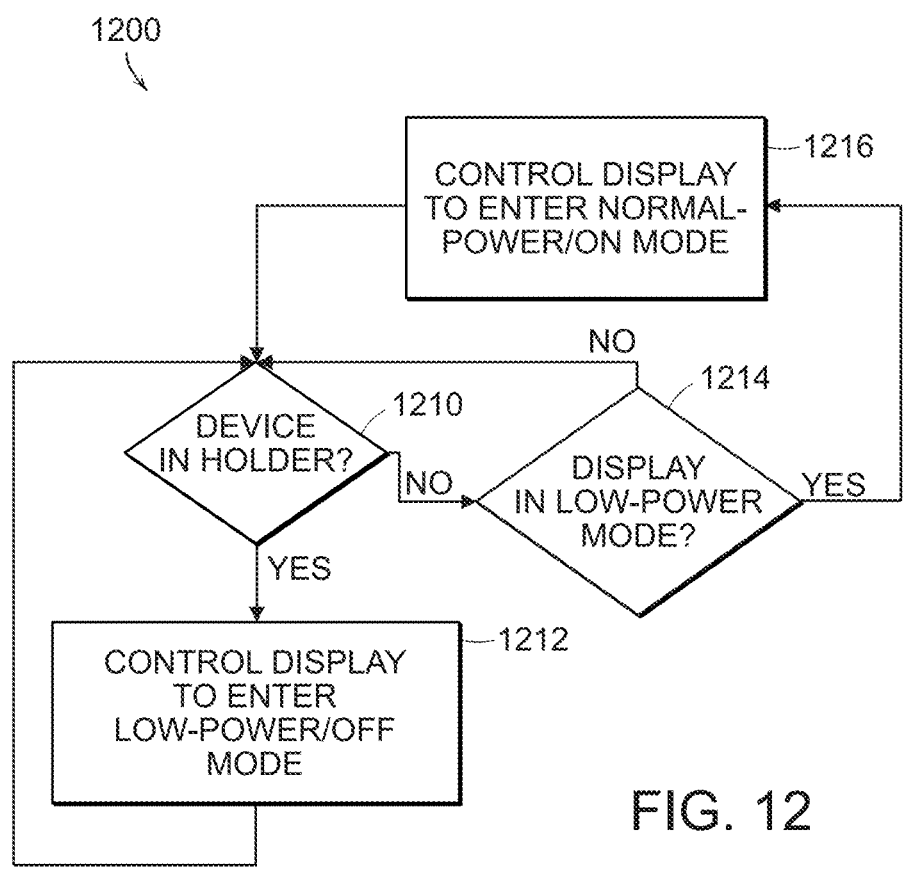
FIG. 12 illustrates a flowchart of a process for controlling an integrated display to enter a low-power mode when an electronic device is secured in the electronic device holder in accordance with some embodiments.

FIG. 12 illustrates a process 1200 for controlling the integrated display 144 to enter a low-power/off mode when an electronic device is secured in the electronic device holder 134. Process 1200 begins in act 1210, where it is determined whether an electronic device is secured in the electronic device holder. Any suitable technique may be used to determine whether an electronic device is secured in the holder. For example, one or more sensors that detect whether the spring-loaded arms are retracted into the handlebars (or the hinge on the alternate design in FIG. 3 is flexed or extended), a light sensor arranged near the integrated display 144, or some other sensor (e.g., a proximity sensor to detect an object in the electronic device holder area) may be used to determine that an electronic device is secured in the holder. Other non-limiting examples of determining that the electronic device is secured in the holder include detecting the presence of the electronic device near the display via near field communication (NFC), Bluetooth, or some other short range wireless technology. When it is determined that there is an electronic device secured in the electronic device holder, process 1200 proceeds to act 1212 where the integrated display 144 is controlled to enter a low-power/off mode. When it is determined that act 1210 that there is no electronic device secured in the electronic device holder, process 1200 proceeds to act 1214 where it is determined whether the integrated display 144 is currently in low-power/off mode. When it is determined that the display is currently in a low-power/off mode, the process proceeds to act 1216 where the integrated display 144 is controlled to operate in a normal/on mode. Process 1200 then returns to act 1210 where the determination of whether an electronic device is secured in the holder may be repeated. The determination in act 1210 of whether an electronic device is secured in the holder may be performed continuously, at any suitable interval, or in response to detection of an event (e.g., using one of the aforementioned sensors).

Figure 13A:
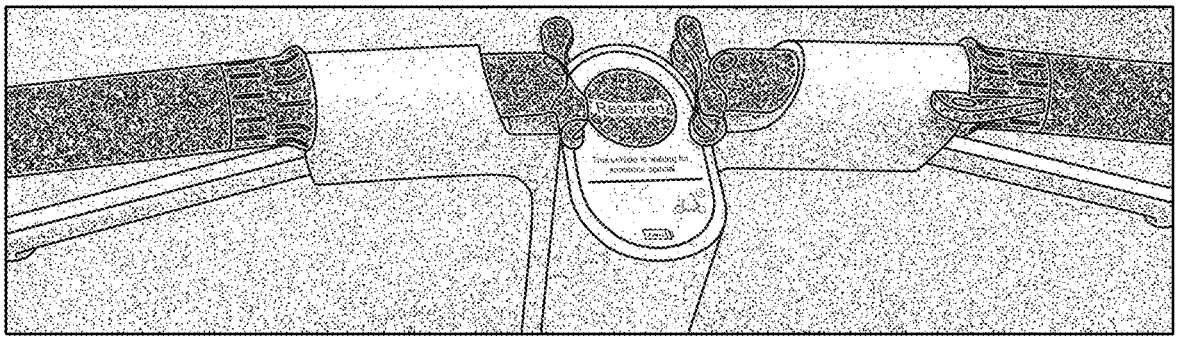
FIGS. 13A-D illustrate providing different display characteristics based on ambient lighting conditions in accordance with some embodiments.
Figure 13B:
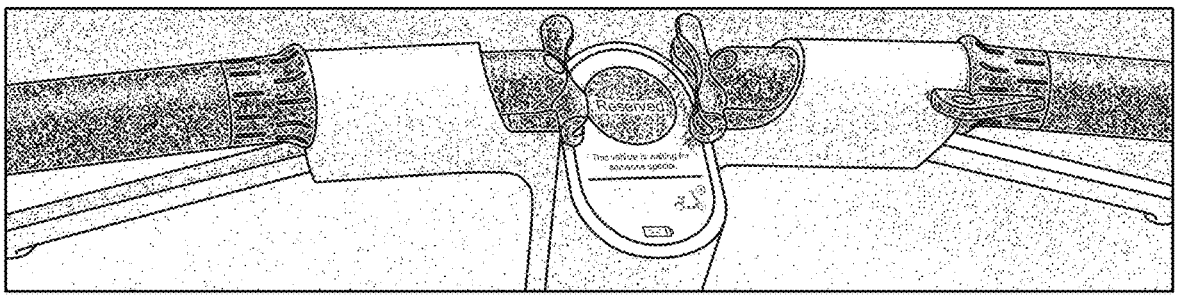

As discussed above, some embodiments are configured to set one or more display characteristics of the integrated display 144 based, at least in part, on ambient lighting conditions thereby ensuring that the display is clear in multiple lighting environments. FIGS. 13A-D illustrate how the display 144 may be changed in different lighting conditions, wherein the lighting conditions are determined, for example, using an ambient light sensor 340, as described in connection with FIG. 3. FIG. 13A shows an example where the ambient lighting environment is indirect sunlight (e.g., on a cloudy day). Under such conditions, the display is configured to generally have good contrast without modification of the display characteristics. FIG. 13B shows an example of a more challenging lighting environment in bright sunshine. To accommodate for such an environment, the display 144 may include an anti-glare coating and/or the brightness of the display may be dimmed to provide a better user experience.

Figure 13C:
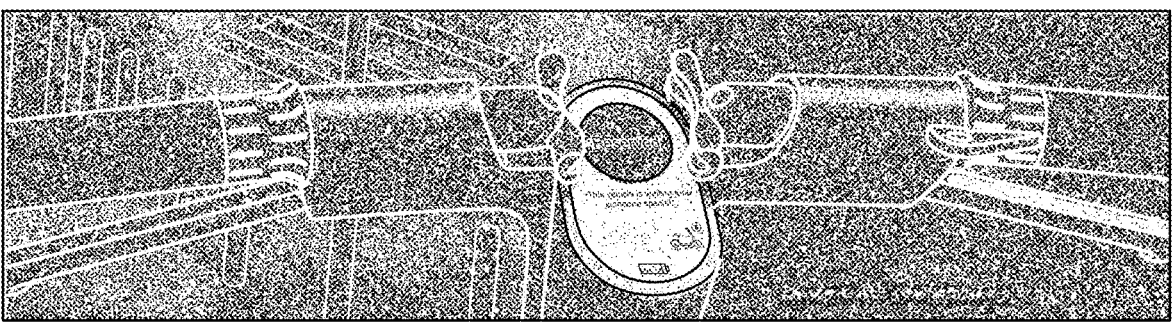
Figure 13D:
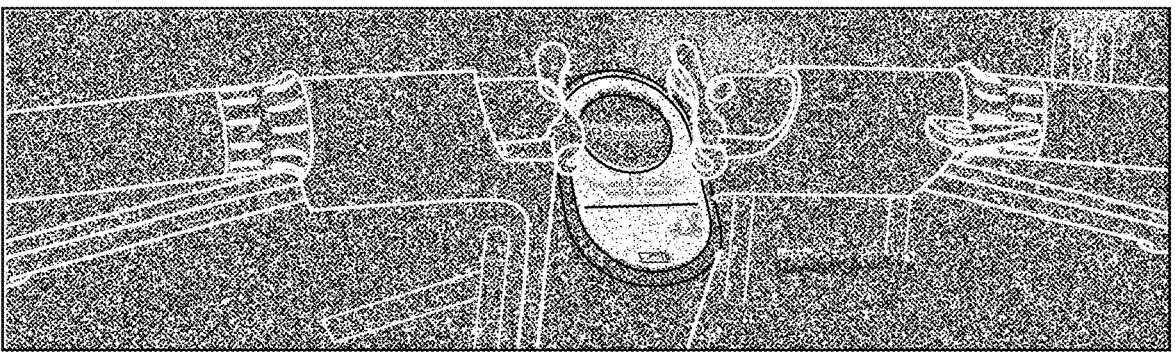

FIGS. 13C and 13D show an ambient lighting environment at night, where the display 144 is illuminated using additional lighting techniques to improve visibility of the display. FIG. 13C shows a backlighting technique where, for example, the brightness of the backlight may be dynamically changed based on a measurement from a light sensor (e.g., light sensor 340). In this example, Dynamic ALS-driven backlight is illustrated. FIG. 13D shows an edge-lighting technique, such as RGB side lighting. In this example, the integrated display 144 includes a substrate (e.g., a glass substrate) that is edge-illuminated using one or more light sources (e.g., one or more light emitting diodes (LEDs)). Such a lighting technique further provides the ability to illuminate the display using different colors that may, for example, signify different information about the vehicle. For example, when the battery power of the vehicle is less than a threshold percentage, the display 144 may be illuminated red to signify to the user that the battery has low charge. Different colors may also be used to signify the availability state of the electric vehicle so a user can quickly identify which vehicles (e.g., in a rack or docking station of vehicles) are available for use. Although certain display characteristics and/or lighting techniques are associated with particular ambient lighting conditions in FIGS. 13A-D, it should be appreciated that any suitable lighting techniques and/or display characteristics be used, as desired for a particular application, and embodiments are not limited in this respect.

Figure 14:
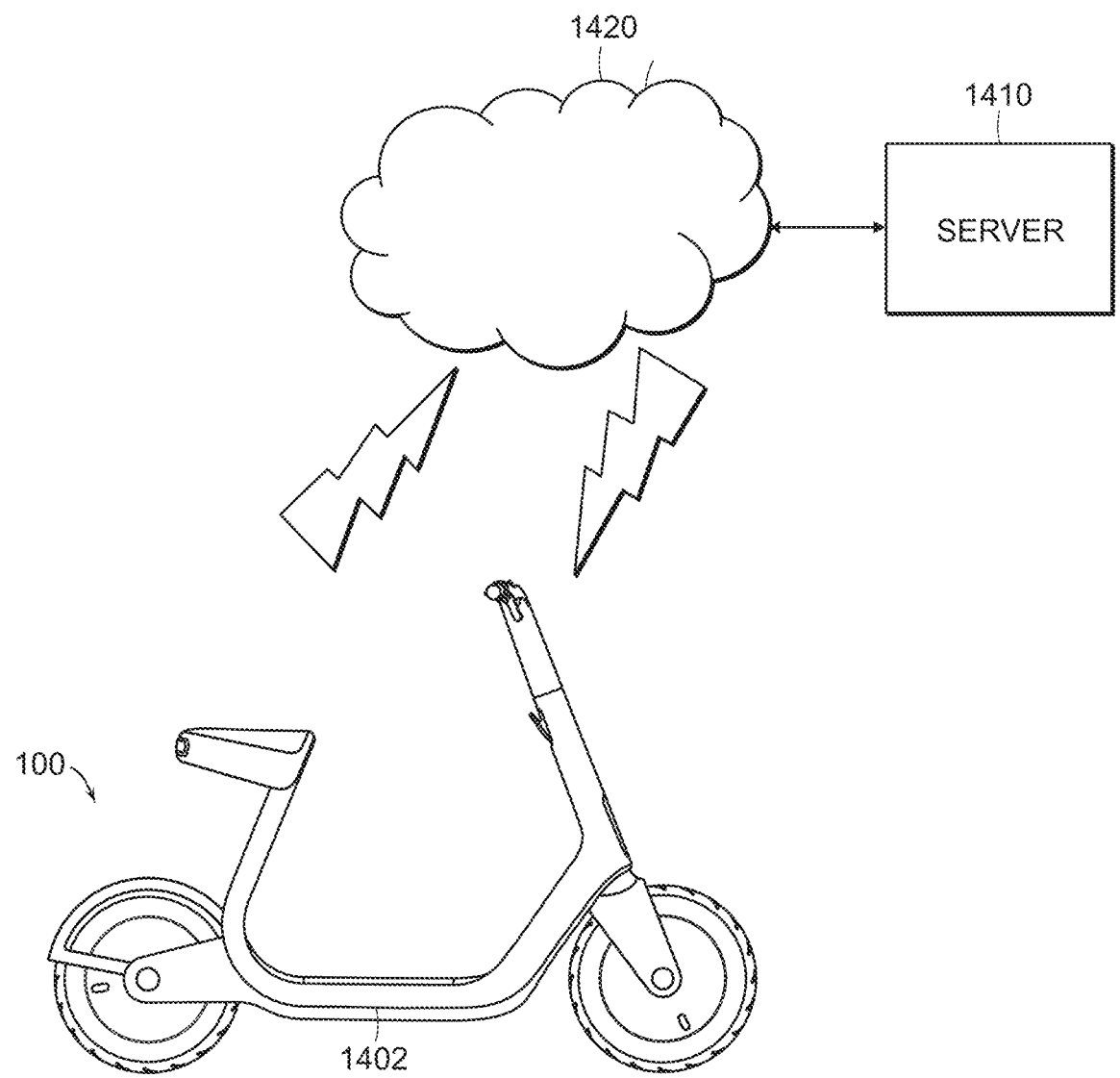
FIG. 14 illustrates communication between an electric vehicle and a network-connected server in accordance with some embodiments.

FIG. 14 illustrates a communication system that may be used to communicate between different components of the electric vehicle system in accordance with some embodiments. Electric vehicle 100 may include control electronics 1402 that include a wireless network interface (e.g., WiFi, cellular, etc.) configured to wirelessly transmit and receive data from a network 1420. Also coupled to the network 1420 is a server 1410 that may be configured to process data received from the vehicle and to provide data to the vehicle for display on the integrated display 144 and/or a display on an electronic device associated with a user interacting with electric vehicle 100. In some embodiments, at least some of the information displayed on integrated display 144 and/or a mobile display on an electronic device may be received directly from control electronics 1402 (e.g., the speed of the vehicle, the battery charge state of the vehicle), whereas other displayed information may be received from server 1410 via network 1420. Yet further displayed information (e.g., navigation information) may be received via network 1420 from a source other than server 1410.

Figure 15:
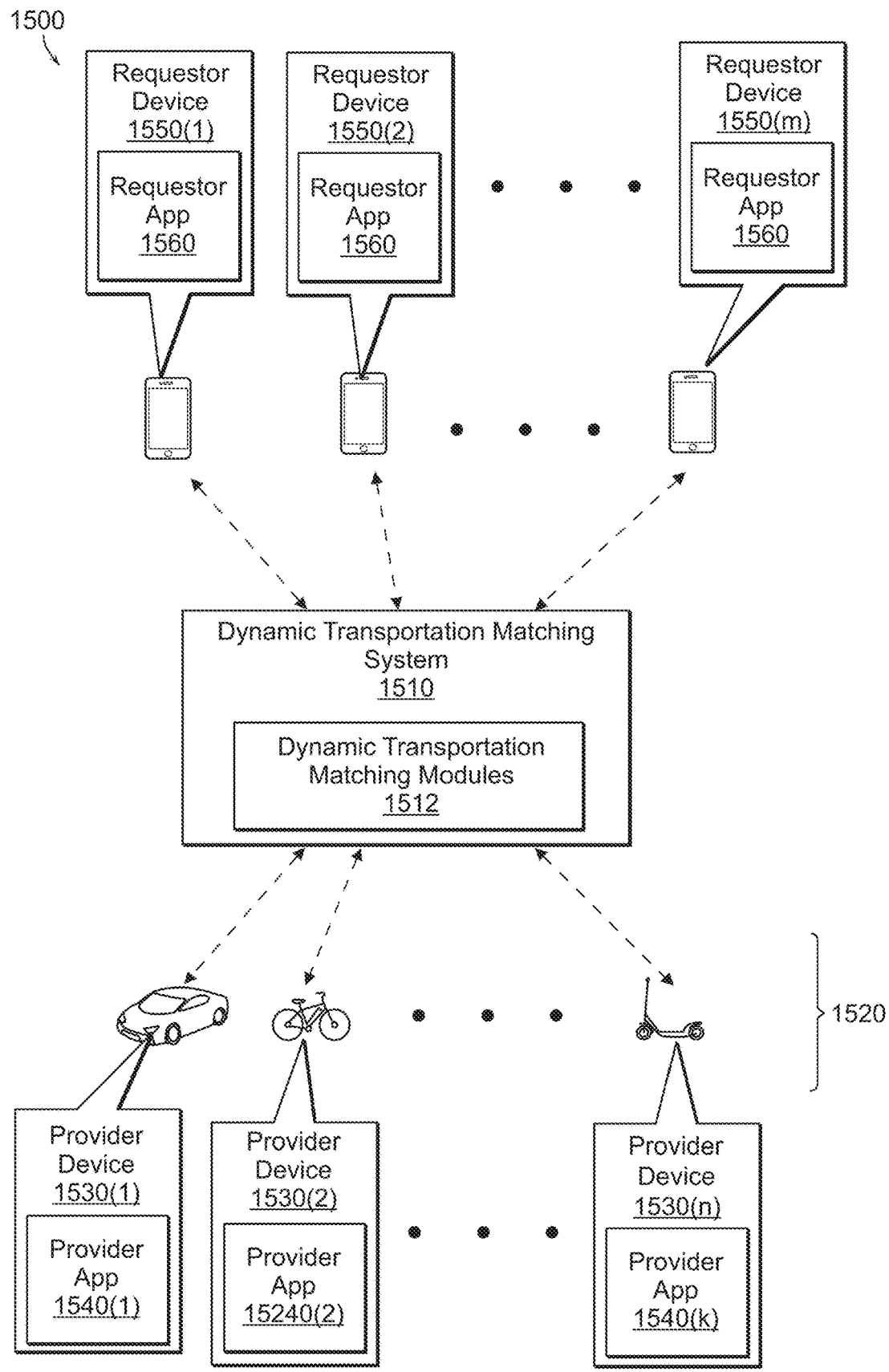
FIG. 15 illustrates an example system for matching transportation requests with a dynamic transportation network that includes personal mobility vehicles.

A micromobility vehicle as described herein may be made available through an on-demand, multimodal transportation system. FIG. 15 illustrates an example system 1500 for matching transportation requests with a dynamic transportation network that includes personal mobility vehicles. As shown in FIG. 15, a dynamic transportation matching system 1510 may be configured with one or more dynamic transportation matching modules 1512 that may perform one or more of the steps described herein. Dynamic transportation matching system 1510 may represent any computing system and/or set of computing systems capable of matching transportation requests. Dynamic transportation matching system 1510 may be in communication with computing devices in each of a group of vehicles 1520. Vehicles 1520 may represent any vehicles that may fulfill transportation requests. In some examples, vehicles 1520 may include disparate vehicle types and/or models. For example, vehicles 1520 may include road-going vehicles and personal mobility vehicles. In some examples, some of vehicles 1520 may be standard commercially available vehicles. According to some examples, some of vehicles 1520 may be owned by separate individuals (e.g., transportation providers). Furthermore, while, in some examples, many or all of vehicles 1520 may be human-operated, in some examples many of vehicles 1520 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requester, and/or an autonomous system for piloting a vehicle. While FIG. 15 does not specify the number of vehicles 1520, it may be readily appreciated that the systems described herein are applicable to hundreds of vehicles, thousands of vehicles, or more. In one example, dynamic transportation matching system 1510 may coordinate transportation matchings within a single region for 50,000 vehicles or more on a given day. In some examples, vehicles 1520 may collectively form a dynamic transportation network that may provide transportation supply on an on-demand basis to transportation requestors.

Dynamic transportation matching system 1510 may communicate with computing devices in each of vehicles 1520. The computing devices may be any suitable type of computing device. In some examples, one or more of the computing devices may be integrated into the respective vehicles 1520. In some examples, one or more of the computing devices may be mobile devices. For example, one or more of the computing devices may be smartphones. Additionally, or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requester and/or provider for a transportation matching application, a navigation application, and/or any other application suited for the use of requesters and/or providers). Additionally, or alternatively, one or more of the computing devices may be devices suitable for installing in a vehicle and/or may be a vehicle's computer that has a transportation management system application installed on the computer in order to provide transportation services to transportation requesters and/or communicate with dynamic transportation matching system 1510.

As shown in FIG. 15, vehicles 1520 may include provider devices 1530(1)-($n$) (e.g., whether integrated into the vehicle, permanently affixed to the vehicle, temporarily affixed to the vehicle, worn by a driver of the vehicle, etc.). In some examples, provider devices 1530(1)-($n$) may include a respective provider app 1540(1)-($k$). Provider apps 1540(1)-($k$) may represent any application, program, and/or module that may provide one or more services related to operating a vehicle and/or providing transportation matching services. For example, provider apps 1540(1)-($k$) may include a transportation matching application for providers and/or one or more applications for matching personal mobility vehicles (PMVs) with requester devices. In some embodiments, different types of provider vehicles may be provisioned with different types of provider devices and/or different provider applications. For example, PMVs may be provisioned with provider devices that are configured with a provider application that enables transportation requesters to reserve and/or operate the PMV while road-constrained vehicles (e.g., cars) may be provisioned with provider devices that are configured with a provider application that enables provider vehicle operators (e.g., transportation providers) to respond to requests from transportation requesters. In some examples, provider applications 1540(1)-($k$) may match the user of provider apps 1540(1)-($k$) (e.g., a transportation provider) with transportation requesters through communication with dynamic transportation matching system 1510. In addition, and as is described in greater detail below, provider apps 1540(1)-($k$) may provide dynamic transportation matching system 1510 with information about a provider (including, e.g., the current location of the provider and/or vehicle) to enable dynamic transportation matching system 1510 to provide dynamic transportation matching and/or management services for the provider and one or more requesters. In some examples, provider apps 1540(1)-($k$) may coordinate communications and/or a payment between a requester and a provider. According to some embodiments, provider apps 1540(1)-($k$) may provide a map service, a navigation service, a traffic notification service, and/or a geolocation service.

Additionally, as shown in FIG. 15, dynamic transportation matching system 1510 may communicate with requester devices 1550(1)-($m$). In some examples, requester devices 1550(1)-($m$) may include a requester app 1560. Requester app 1560 may represent any application, program, and/or module that may provide one or more services related to requesting transportation matching services. For example, requester app 1560 may include a transportation matching application for requesters. In some examples, requester app 1560 may match the user of requester app 1560 (e.g., a transportation requester) with transportation providers through communication with dynamic transportation matching system 1510. In addition, and as is described in greater detail below, requester app 1560 may provide dynamic transportation matching system 1510 with information about a requester (including, e.g., the current location of the requester) to enable dynamic transportation matching system 1510 to provide dynamic transportation matching services for the requester and one or more providers. In some examples, requester app 1560 may coordinate communications and/or a payment between a requester and a provider. According to some embodiments, requester app 1560 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requesters with one or more transportation providers. For example, a transportation matching system may provide one or more transportation matching services for a networked transportation service, a ride sourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requesters to ride opportunities and/or that arranges for requesters and/or providers to meet), a mapping system, a navigation system (e.g., to help a provider reach a requester, to help a requester reach a provider, and/or to help a provider reach a destination), a reputation system (e.g., to rate and/or gauge the trustworthiness of a requester and/or a provider), a payment system, and/or an autonomous or semi-autonomous driving system. The transportation matching system may be implemented on various platforms, including a requester-owned mobile device, a computing system installed in a vehicle, a requester-owned mobile device, a server computer system, or any other hardware platform capable of providing transportation matching services to one or more requesters and/or providers.

Figure 16:
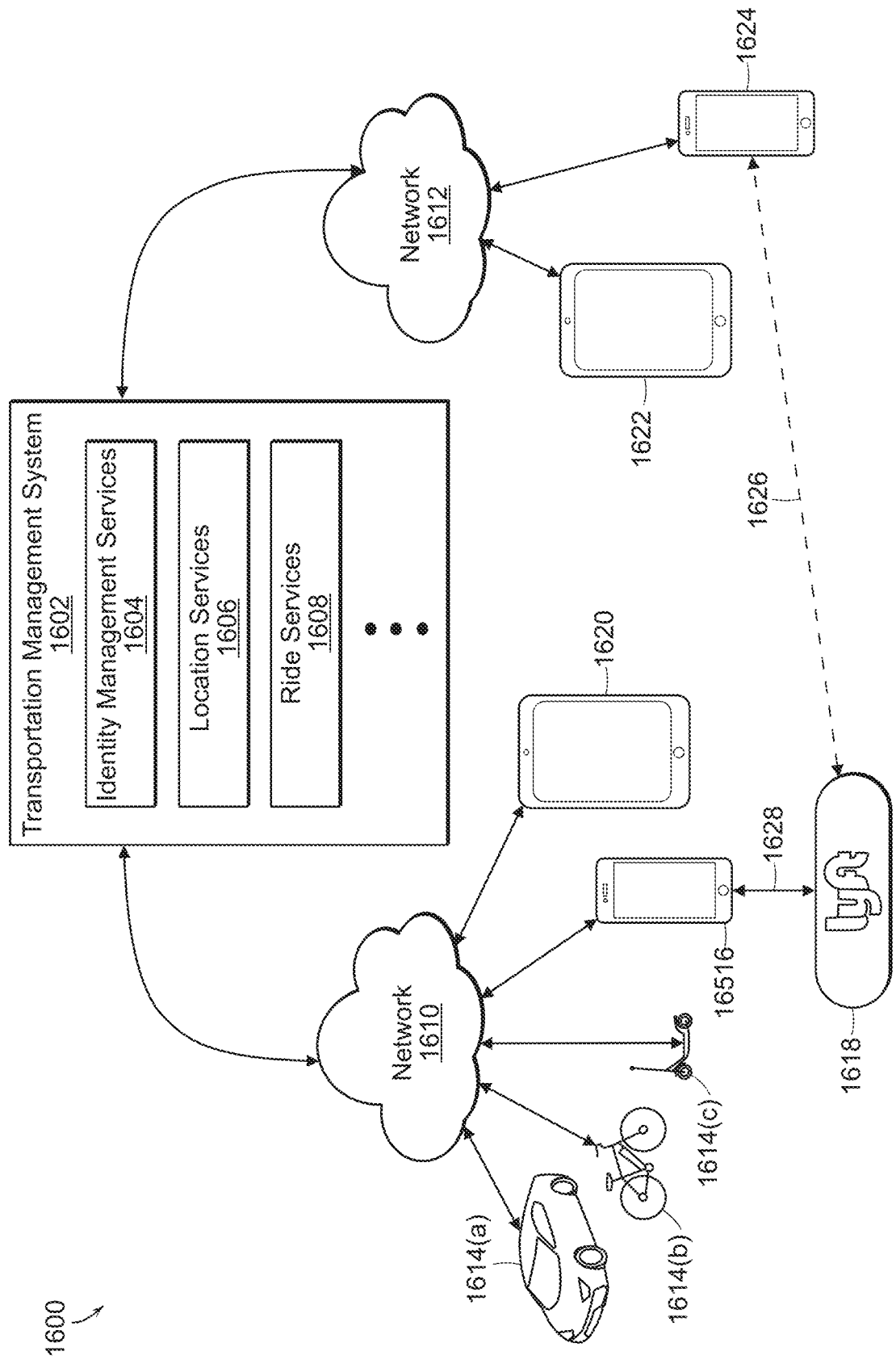
FIG. 16 shows a transportation management environment in accordance with various embodiments.

FIG. 16 shows a transportation management environment 1600, in accordance with various embodiments. As shown in FIG. 16, a transportation management system 1602 may run one or more services and/or software applications, including identity management services 1604, location services 1606, ride services 1608, and/or other services. Although FIG. 16 shows a certain number of services provided by transportation management system 1602, more or fewer services may be provided in various implementations. In addition, although FIG. 16 shows these services as being provided by transportation management system 1602, all or a portion of any of the services may be processed in a distributed fashion. For example, computations associated with a service task may be performed by a combination of transportation management system 1602 (including any number of servers, databases, etc.), one or more devices associated with a provider (e.g., devices integrated with managed vehicles 1614(a), 1614(b), and/or 1614(c); provider computing devices 1616 and tablets 1620; and transportation management vehicle devices 1618), and/or more or more devices associated with a ride requester (e.g., the requester's computing devices 1624 and tablets 1622). In some embodiments, transportation management system 1602 may include one or more general purpose computers, server computers, clustered computing systems, cloud-based computing systems, and/or any other computing systems or arrangements of computing systems. Transportation management system 1602 may be configured to run any or all of the services and/or software components described herein. In some embodiments, the transportation management system 1602 may include an appropriate operating system and/or various server applications, such as web servers capable of handling hypertext transport protocol (HTTP) requests, file transfer protocol (FTP) servers, database servers, etc.

In some embodiments, identity management services 1604 may be configured to perform authorization services for requesters and providers and/or manage their interactions and/or data with transportation management system 1602. This may include, e.g., authenticating the identity of providers and determining that they are authorized to provide services through transportation management system 1602. Similarly, requesters' identities may be authenticated to determine whether they are authorized to receive the requested services through transportation management system 1602. Identity management services 1604 may also manage and/or control access to provider and/or requester data maintained by transportation management system 1602, such as driving and/or ride histories, vehicle data, personal data, preferences, usage patterns as a ride provider and/or as a ride requester, profile pictures, linked third-party accounts (e.g., credentials for music and/or entertainment services, social-networking systems, calendar systems, task-management systems, etc.) and any other associated information. Transportation management system 1602 may also manage and/or control access to provider and/or requester data stored with and/or obtained from third-party systems. For example, a requester or provider may grant transportation management system 1602 access to a third-party email, calendar, or task management system (e.g., via the user's credentials). As another example, a requester or provider may grant, through a mobile device (e.g., 1616, 1620, 1622, or 1624), a transportation application associated with transportation management system 1602 access to data provided by other applications installed on the mobile device. In some examples, such data may be processed on the client and/or uploaded to transportation management system 1602 for processing.

In some embodiments, transportation management system 1602 may provide ride services 1608, which may include ride matching and/or management services to connect a requester to a provider. For example, after identity management services module 1604 has authenticated the identity a ride requester, ride services module 1608 may attempt to match the requester with one or more ride providers. In some embodiments, ride services module 1608 may identify an appropriate provider using location data obtained from location services module 1606. Ride services module 1608 may use the location data to identify providers who are geographically close to the requester (e.g., within a certain threshold distance or travel time) and/or who are otherwise a good match with the requester. Ride services module 1608 may implement matching algorithms that score providers based on, e.g., preferences of providers and requesters; vehicle features, amenities, condition, and/or status; providers' preferred general travel direction and/or route, range of travel, and/or availability; requesters' origination and destination locations, time constraints, and/or vehicle feature needs; and any other pertinent information for matching requesters with providers. In some embodiments, ride services module 1608 may use rule-based algorithms and/or machine-learning models for matching requesters and providers.

Transportation management system 1602 may communicatively connect to various devices through networks 1610 and/or 1612. Networks 1610 and 1612 may include any combination of interconnected networks configured to send and/or receive data communications using various communication protocols and transmission technologies. In some embodiments, networks 1610 and/or 1612 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1610 and/or 1612 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Bluetooth 5, Near Field Communication (NFC), Z-Wave, and ZigBee). In various embodiments, networks 1610 and/or 1612 may include any combination of networks described herein or any other type of network capable of facilitating communication across networks 1610 and/or 1612.

In some embodiments, transportation management vehicle device 1618 may include a provider communication device configured to communicate with users, such as drivers, passengers, pedestrians, and/or other users. In some embodiments, transportation management vehicle device 1618 may communicate directly with transportation management system 1602 or through another provider computing device, such as provider computing device 1616. In some embodiments, a requester computing device (e.g., device 1624) may communicate via a connection 1626 directly with transportation management vehicle device 1618 via a communication channel and/or connection, such as a peer-to-peer connection, Bluetooth connection, NFC connection, ad hoc wireless network, and/or any other communication channel or connection. Although FIG. 16 shows particular devices communicating with transportation management system 1602 over networks 1610 and 1612, in various embodiments, transportation management system 1602 may expose an interface, such as an application programming interface (API) or service provider interface (SPI) to enable various third parties which may serve as an intermediary between end users and transportation management system 1602.

In some embodiments, devices within a vehicle may be interconnected. For example, any combination of the following may be communicatively connected: vehicle 1614, provider computing device 1616, provider tablet 1620, transportation management vehicle device 1618, requester computing device 1624, requester tablet 1622, and any other device (e.g., smart watch, smart tags, etc.). For example, transportation management vehicle device 1618 may be communicatively connected to provider computing device 1616 and/or requester computing device 1624. Transportation management vehicle device 1318 may establish communicative connections, such as connections 1626 and 1628, to those devices via any suitable communication technology, including, e.g., WLAN technologies implementing the IEEE 902.12 family of standards, Bluetooth, Bluetooth Low Energy, Bluetooth 5, NFC, Z-Wave, ZigBee, and any other suitable short-range wireless communication technology.

In some embodiments, users may utilize and interface with one or more services provided by the transportation management system 1602 using applications executing on their respective computing devices (e.g., 1616, 1618, 1620, and/or a computing device integrated within vehicle 1614), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1614 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requester, including an application associated with transportation management system 1602. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 17:
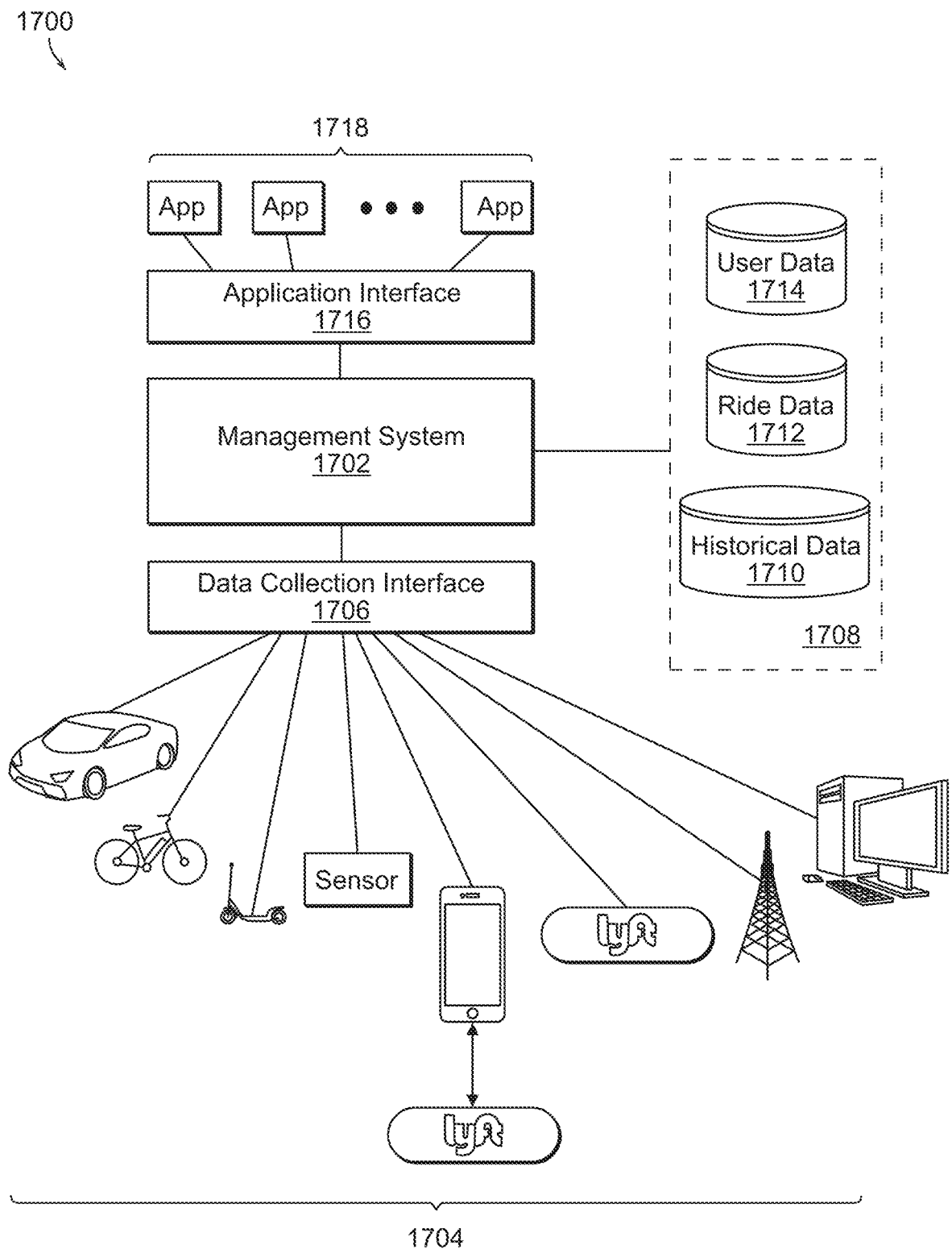
FIG. 17 shows a data collection and application management environment in accordance with various embodiments.

FIG. 17 shows a data collection and application management environment 1700, in accordance with various embodiments. As shown in FIG. 17, management system 1702 may be configured to collect data from various data collection devices 1704 through a data collection interface 1706. As discussed above, management system 1702 may include one or more computers and/or servers or any combination thereof. Data collection devices 1704 may include, but are not limited to, user devices (including provider and requester computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1706 can include, e.g., an extensible device framework configured to support interfaces for each data collection device. In various embodiments, data collection interface 1706 may be extended to support new data collection devices as they are released and/or to update existing interfaces to support changes to existing data collection devices. In various embodiments, data collection devices may communicate with data collection interface 1706 over one or more networks. The networks may include any network or communication protocol as would be recognized by one of ordinary skill in the art, including those networks discussed above.

As shown in FIG. 17, data received from data collection devices 1704 can be stored in data store 1708. Data store 1708 may include one or more data stores, such as databases, object storage systems and services, cloud-based storage services, and other data stores. For example, various data stores may be implemented on a non-transitory storage medium accessible to management system 1702, such as historical data store 1710, ride data store 1712, and user data store 1714. Data stores 1708 can be local to management system 1702, or remote and accessible over a network, such as those networks discussed above or a storage area network or other networked storage system. In various embodiments, historical data 1710 may include historical traffic data, weather data, request data, road condition data, or any other data for a given region or regions received from various data collection devices. Ride data store 1712 may include route data, request data, timing data, and other ride related data, in aggregate and/or by requester or provider. User data 1714 may include user account data, preferences, location history, and other user-specific data. Although certain data stores are shown by way of example, any data collected and/or stored according to the various embodiments described herein may be stored in data stores 1708.

As shown in FIG. 17, an application interface 1716 can be provided by management system 1702 to enable various apps 1718 to access data and/or services available through management system 1702. Apps 1718 may run on various user devices (including provider and requester computing devices, such as those discussed above) and/or may include cloud-based or other distributed apps configured to run across various devices (e.g., computers, servers, or combinations thereof). Apps 1718 may include, e.g., aggregation and/or reporting apps which may utilize data 1708 to provide various services (e.g., third-party ride request and management apps). In various embodiments, application interface 1716 can include an API and/or SPI enabling third party development of apps 1718. In some embodiments, application interface 1716 may include a web interface, enabling web-based access to data 1708 and/or services provided by management system 1702. In various embodiments, apps 1718 may run on devices configured to communicate with application interface 1716 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally, or alternatively, without limitation to transportation services, a matching system for any service may facilitate the fulfillment of requests using both human drivers and autonomous vehicles.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of an electric vehicle may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the motor driving a wheel of the vehicle, receiving and processing control signals from a central server, and/or displaying information to a user. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A micromobility electric vehicle comprising:
   handlebars coupled to an upper portion of a stem and configured to steer the vehicle;
   an electronic device holder having at least one spring-loaded arm, wherein the at least one spring-loaded arm is configured to apply a force against one or more edges of an electronic device when arranged against the at least one spring-loaded arm, wherein the electronic device has a mobile display; and
   an integrated display configured to display information about the micromobility electric vehicle;
   wherein the electronic device holder and the integrated display are arranged to form at least a portion of a top surface of the upper portion of the stem, and the electronic device holder is positioned above the integrated display.

2. The micromobility electric vehicle of claim 1, wherein the integrated display comprises a substrate configured to be edge-lit using one or more light-emitting diodes.

3. The micromobility electric vehicle of claim 1, wherein the integrated display is configured to turn off when the electronic device is present in the electronic device holder.

4. The micromobility electric vehicle of claim 1, further comprising a light sensor configured to measure ambient light, and wherein the integrated display is configured to change at least one display characteristic based, at least in part, on a measurement of ambient light by the light sensor.

5. The micromobility electric vehicle of claim 4, wherein the at least one display characteristic comprises a brightness of the integrated display.

6. The micromobility electric vehicle of claim 1, further comprising:
   control electronics configured to:
      measure vehicle information recorded by one or more sensors on the vehicle; and
      wirelessly transmit the vehicle information for reception at the electronic device when present in the electronic device holder for display on the mobile display of the electronic device.

7. The micromobility electric vehicle of claim 6, wherein wirelessly transmitting the vehicle information for reception at the electronic device comprises:
   uploading the vehicle information from the control electronics to a server; and
   enabling the electronic device to receive the vehicle information from the server.

8. The micromobility electric vehicle of claim 6, wherein wirelessly transmitting the vehicle information for reception at the electronic device comprises transmitting the vehicle information directly from the control electronics to the electronic device using a near field communication technique.

9. The micromobility electric vehicle of claim 6, wherein
   the one or more sensors are configured to determine a current interaction state between a user and the micromobility electric vehicle, and
   the information displayed on the integrated display and/or the mobile display is determined, at least in part, on the current interaction state.

10. The micromobility electric vehicle of claim 1, wherein the information about the micromobility electric vehicle is a battery level and/or vehicle availability information.

11. The micromobility electric vehicle of claim 10, wherein the vehicle availability information comprises one or more of a locked status, a reserved status, a service status, and authorization information.

12. The micromobility electric vehicle of claim 1, further comprising an electronic card reader arranged in proximity to the top surface of the upper portion of the stem, wherein the electronic card reader is configured to communicate with an electronic card placed proximate to the electronic card reader using a near field communication technique to authorize use of the micromobility electric vehicle.

13. The micromobility electric vehicle of 1, further comprising:
   a wireless charging transmitter mounted on the upper portion of the stem, wherein the wireless charging transmitter is configured to wirelessly charge the electronic device when secured in the electronic device holder.

14. The micromobility electric vehicle of 1, wherein the electronic device is a smartphone.

15. A method of operating a micromobility electric vehicle, the method comprising:
   displaying, on an integrated display, first information about the micromobility electric vehicle;

receiving an electronic device comprising a mobile display in an electronic device holder that includes at least one spring-loaded arm above the integrated display;

retaining the electronic device between handlebars of the micromobility electric vehicle via force exerted on edges of the electronic device by the at least one spring-loaded arm, wherein the handlebars are arranged to couple an upper portion of a stem and configured to steer the micromobility electric vehicle wherein the electronic device holder and the integrated display are arranged to form at least a portion of a top surface of the upper portion of the stem;

wirelessly receiving second information about an operation of the micromobility electric vehicle; and rendering on the mobile display the received second information.

16. The method of operating the micromobility electric vehicle of claim 15, further comprising:

rendering on the mobile display, navigation information received over a wide area network.

17. The method of operating the micromobility electric vehicle of claim 16, wherein the navigation information comprises bike lane information.

18. A micromobility electric vehicle comprising:

handlebars coupled to an upper portion of a stem and configured to steer the vehicle;

one or more sensors configured to determine a current interaction state between a user and the micromobility electric vehicle based, at least in part, on a proximity of the user to the micromobility electric vehicle;

an integrated display arranged to form at least a portion of a top surface of the upper portion of the stem, wherein the integrated display is configured to display information about the micromobility electric vehicle, wherein the information is determined, at least in part, on the current interaction state; and an electronic device holder having at least one spring-loaded arm, wherein the at least one spring-loaded arm is configured to apply a force against one or more edges of an electronic device when arranged against the at least one spring-loaded arm, wherein the electronic device has a mobile display; and wherein the electronic device holder and the integrated display are arranged to form at least a portion of a top surface of the upper portion of the stem, and the electronic device holder is positioned above the integrated display.

19. The micromobility electric vehicle of claim 18, wherein the information about the micromobility electric vehicle is a battery level and/or vehicle availability information.

20. The micromobility electric vehicle of claim 19, wherein the vehicle availability information comprises one or more of a locked status, a reserved status, a service status, and authorization information.

* * * * *